United States Patent
Nakamura et al.

(10) Patent No.: US 10,936,236 B2
(45) Date of Patent: Mar. 2, 2021

(54) REWRITING SYSTEM, REWRITING DEVICE AND COMPUTER

(71) Applicant: Yazaki Corporation, Tokyo (JP)

(72) Inventors: Yoshihide Nakamura, Susono (JP); Satoshi Morita, Susono (JP); Yasuyuki Shigezane, Susono (JP); Yoshinori Ikuta, Susono (JP); Shuuji Satake, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 137 days.

(21) Appl. No.: 15/924,645

(22) Filed: Mar. 19, 2018

(65) Prior Publication Data

US 2018/0300059 A1   Oct. 18, 2018

(30) Foreign Application Priority Data

Apr. 12, 2017  (JP) .............................. JP2017-078667
May  29, 2017  (JP) .............................. JP2017-105450
Jun. 29, 2017  (JP) .............................. JP2017-127507

(51) Int. Cl.
*G06F 3/06*   (2006.01)
*G06F 8/60*   (2018.01)
*G06F 8/654*  (2018.01)
*G06F 8/65*   (2018.01)

(52) U.S. Cl.
CPC ............ *G06F 3/065* (2013.01); *G06F 3/0604* (2013.01); *G06F 3/0679* (2013.01); *G06F 8/60* (2013.01); *G06F 8/654* (2018.02); *G06F 8/66* (2013.01)

(58) Field of Classification Search
CPC ...... G06F 3/065; G06F 3/0604; G06F 3/0679; G06F 3/061; G06F 3/0611; G06F 3/0655; G06F 8/654; G06F 8/66; G06F 8/60; G06F 8/61; G06F 8/65
See application file for complete search history.

(56) References Cited

U.S. PATENT DOCUMENTS 5,660,454 A * 8/1997 Mori ...................... B60Q 1/085
                                                            362/466
6,151,708 A * 11/2000 Pedrizetti .................. G06F 8/65
                                                            717/173

(Continued)

FOREIGN PATENT DOCUMENTS

JP       2000-043654 A    2/2000
JP       2000-148475 A    5/2000

(Continued)

*Primary Examiner* — Michael Krofcheck
(74) *Attorney, Agent, or Firm* — Sughrue Mion, PLLC

(57) ABSTRACT

Provided are a rewriting system capable of shortening rewrite time, a rewriting system and a computer used for the rewriting system. The rewriting system includes an ECU and a rewriting device for at least transmitting to the ECU a rewrite data of memory contents stored in a flash ROM 14B (memory), the flash ROM 14B (memory) includes a rewrite target area A2 in which the memory contents to be rewritten are stored and a non-rewrite target area A1 in which the memory contents not to be rewritten are stored, and the rewriting device transmits the rewrite data of the memory contents to the ECU only for the memory contents of the rewrite target area in the flash ROM 14B (memory).

13 Claims, 11 Drawing Sheets

(56) References Cited

U.S. PATENT DOCUMENTS

| | | | | |
|---|---|---|---|---|
| 2003/0063896 | A1* | 4/2003 | Gonzalez Tovar | G06F 8/65 386/252 |
| 2006/0164229 | A1* | 7/2006 | Masters | G01D 11/28 340/461 |
| 2006/0259207 | A1* | 11/2006 | Natsume | G06F 8/65 701/1 |
| 2010/0103186 | A1* | 4/2010 | Luengen | G09G 5/10 345/589 |
| 2013/0198732 | A1* | 8/2013 | Fujita | G06F 8/65 717/170 |
| 2017/0003895 | A1* | 1/2017 | Hatfield | G06F 3/0619 |
| 2017/0017482 | A1* | 1/2017 | Yabe | G06F 8/65 |

FOREIGN PATENT DOCUMENTS

| | | | |
|---|---|---|---|
| JP | 2001236233 | A * | 8/2001 |
| JP | 2003-104138 | A | 4/2003 |
| JP | 2003-208326 | A | 7/2003 |
| JP | 2004-287712 | A | 10/2004 |
| JP | 2008309774 | A | 12/2008 |
| JP | 2011-142695 | A | 7/2011 |
| JP | 2015210669 | A | 11/2015 |
| JP | 2016-012220 | A | 1/2016 |
| JP | 2016-126699 | A | 7/2016 |

\* cited by examiner

REWRITING SYSTEM, REWRITING DEVICE AND COMPUTER

TECHNICAL FIELD

The present invention relates to a rewriting system, a rewriting device, and a computer.

BACKGROUND ART

Recently, automobiles are equipped with ECUs for engine control, running control, navigation, information communication, etc. With the advancement and diversification of information processing in automobiles, improvements or new developments in automotive-use software are taking place and it is necessary to take account of versioning of the program after the car sales.

Patent Document 1 describes a technique for rewrite programs such as a vehicle control system.

In the technology described above, there is a problem that a rewrite time tends to become long because the entire contents, when rewriting, are written to the ECU by linking the contents remaining to be written and those to be written.

In addition, Patent Document 2 discloses a technique for rewriting a program at a high speed when environmental conditions such as battery voltage and temperature are satisfied.

However, in the conventional technology described above, there is a problem that a case of a plurality of ECUs is not considered, and rewriting operation must be repeated for each ECU, so that the rewrite time cannot be shortened.

Many ECUs control multiple loads mounted on vehicles such as valves and motors, etc. When some control objects are replaced with new ones, it may be necessary to rewrite programs such as programs related to the control of the control object in the contents of the memory in the ECU's memory. However, many ECUs cannot partially rewrite the memory contents of the memory, and are required to rewrite all stored memory even when rewriting partially, requiring a flexible rewriting technology.

PATENT DOCUMENT

Patent Document 1: Japanese Patent Application Laid-Open No. 2000-43654

Patent Document 2: Japanese Patent Application Laid-Open No. 2000-148475

SUMMARY OF INVENTION

Technical Problem

The first object of the present invention is to provide a rewriting system capable of shortening the rewrite time, and a rewriting device and a computer used for the rewriting system in view of the above background.

The second object of the present invention is to provide a rewriting system capable of flexibly rewriting, and a rewriting device and a computer used for the rewriting system in view of the above background.

SUMMARY OF INVENTION

Solution to Problem

A rewriting system that is one aspect of the present invention includes a computer including a memory, a rewriting device for at least transmitting to the computer a rewrite data of memory contents stored in the memory, the memory in the computer includes a rewrite target area in which memory contents to be rewritten are stored, and a non-rewrite target area in which memory contents not to be rewritten are stored, and the rewriting device sends the rewrite data of the memory contents to the computer only for the memory contents of the rewrite target area in the memory.

In addition, the above-mentioned rewrite target area is divided into a variable area in which one or more programs are stored, and a variable area in which a variable used for processing is stored each one or more programs, and a setting value area in which the setting value used for processing is stored each one or more programs, the rewriting device may select any one or more programs among a program stored in the above program area, a variable stored in the variable area, and a setting value stored in the setting value area and transmit the rewrite data for the data.

A rewriting device, which is one aspect of the present invention, is a rewriting device that at least sends to the computer a rewrite data stored in the memory of the computer, the memory includes a rewrite target data in which memory contents to be rewritten are stored and a non-rewrite target area in which the memory contents to be rewritten are stored, and the rewrite data of the memory contents is transmitted to the above-mentioned computer only for the memory contents of the rewrite target area in the memory.

A computer that is one aspect of the present invention includes a memory and at least receives from the rewriting device the rewrite data of the memory contents of the memory, and the memory includes a rewrite target area in which the memory contents to be rewritten are stored, and a non-rewrite target area in which memory contents not to be rewritten are stored.

In a rewriting system that is one aspect of the present invention including a plurality of computers and a rewriting device for rewriting the memory contents stored in the plurality of computers, each of the plurality of the computers includes a common area for storing common memory contents common to each other and a non-common area for storing non-common memory contents non-common to each other, the rewriting device collectively transmits the rewrite data of the common memory contents to the plurality of computers, and sequentially transmits the rewrite data of the non-common memory contents to the computer to be rewritten.

Also, the rewriting system may include a non-rewrite target area each of the plurality of computers stores the memory contents that is not to be rewritten.

In the rewriting system, the rewriting device may transmit at the communication speed corresponding to the data amount of the rewrite data.

In a rewriting device that is one aspect of the present invention which rewrites the contents of a plurality of computers, the rewrite data of the common memory contents common to the plurality of computers is collectively transmitted to the plurality of computers, and the rewrite data of the non-common memory contents non-common to the plurality of computers is sequentially transmitted to the computer to be rewritten.

A computer that is one aspect of the present invention is a computer in which the memory contents can be rewritten by the rewriting device including a common area in which the common memory contents common to other computers are stored and a non-common area in which the non-common memory contents non-common to the other computers are stored.

The rewriting system that is one aspect of the present invention is a rewriting system including computer controlling a plurality of control objects and having a memory, and a rewriting device transmitting a rewrite data of memory contents stored in the memory to a plurality of the computers, and the memory in the computer is provided with a plurality of channel areas in which memory contents used for control of each of the plurality of control objects in correspondence with the plurality of control objects, a mask setting section for performing mask setting processing setting a mask target area for prohibiting rewriting and a mask exclusion area for permitting rewriting, among the plurality of channel areas is provided, the rewriting device transmits the rewrite data of the memory contents for all of the plurality of channel areas, and the computer rewrites the memory contents of the mask exclusion area using the rewrite data corresponding to the mask exclusion area among the rewrite data transmitted from the rewriting device.

In addition, the mask setting section may be set in the computer to perform the mask setting processing.

In addition, the mask setting section may include a plurality of local switches provided in the computer, so as to know that each of the channel areas is any one of the mask target area and the mask exclusion area depending on ON/OFF states of the plurality of local switches.

In addition, the plurality of local switches may correspond to the plurality of channel areas.

In addition, a plurality of computers is provided, and the mask setting section individually performs the mask setting processing for each of the computers, and the rewriting device transmits the rewrite data of all the memory contents of the plurality of channel areas commonly for all of the plurality of computers.

The rewriting device that is one aspect of the present invention is a rewriting device capable of transmitting to a plurality of computers the rewrite data of the memory contents stored in the memory included in the computer that controls the plurality of control objects, the memory in the computer is provided with a plurality of channel areas in which the memory contents used for controlling each of the plurality of control objects are stored in correspondence with the plurality of control objects, the plurality of channel areas is implemented with a mask setting processing setting a mask target area for prohibiting rewriting and a mask exclusion area for permitting rewriting, and the rewrite data of the memory contents for all of the plurality of channel areas is transmitted to the computer.

A computer that is one aspect of the present invention is a computer controlling a plurality of control objects and including a memory, and receiving rewrite data of the memory contents of the memory from a rewriting device, the memory is provided with a plurality of channel areas in which the memory contents used for controlling each of the plurality of control objects are respectively stored in correspondence with the plurality of control objects, the plurality of channel areas is implemented with a mask setting processing setting a mask target area for prohibiting rewriting, and a mask exclusion area for permitting rewriting, and the memory contents of the mask exclusion area is rewritten using the rewrite data corresponding to the memory exclusion area among the rewrite data transmitted from the rewriting device for all of the plurality of channel areas.

Effect of the Invention

As described above, according to the above aspect, since the rewrite data is transmitted only for the memory contents of the rewrite target area in the memory included in the computer, the rewrite time can be shortened.

In addition, according to the above aspect, it is possible to rewrite common areas of the plurality of computers at a time, thereby shortening the rewrite time.

In addition, it is possible to prohibit or permit rewriting of any channel area in the mask setting section, so that all the channel areas can be rewritten for the memory of the computer, or the desired channel area can be rewritten or can be flexibly rewritten.

On the other hand, the rewriting device does not need to know which channel area is prohibited from being rewritten or allowed to be rewritten, and it is only necessary to send the rewrite data of all the channel areas in a simple manner. The computer only needs to receive the rewrite data and rewrite it as a target for the mask exclusion area that is allowed to be rewritten in the mask setting processing so that, according to the rewriting system, the rewriting device, and the computer, it is also possible to reduce the rewrite time since the processing required for rewriting is simple, and furthermore, the rewriting error can be reduced since the processing required for rewriting is simple.

DESCRIPTION OF EMBODIMENTS

First Embodiment

Figure 1:
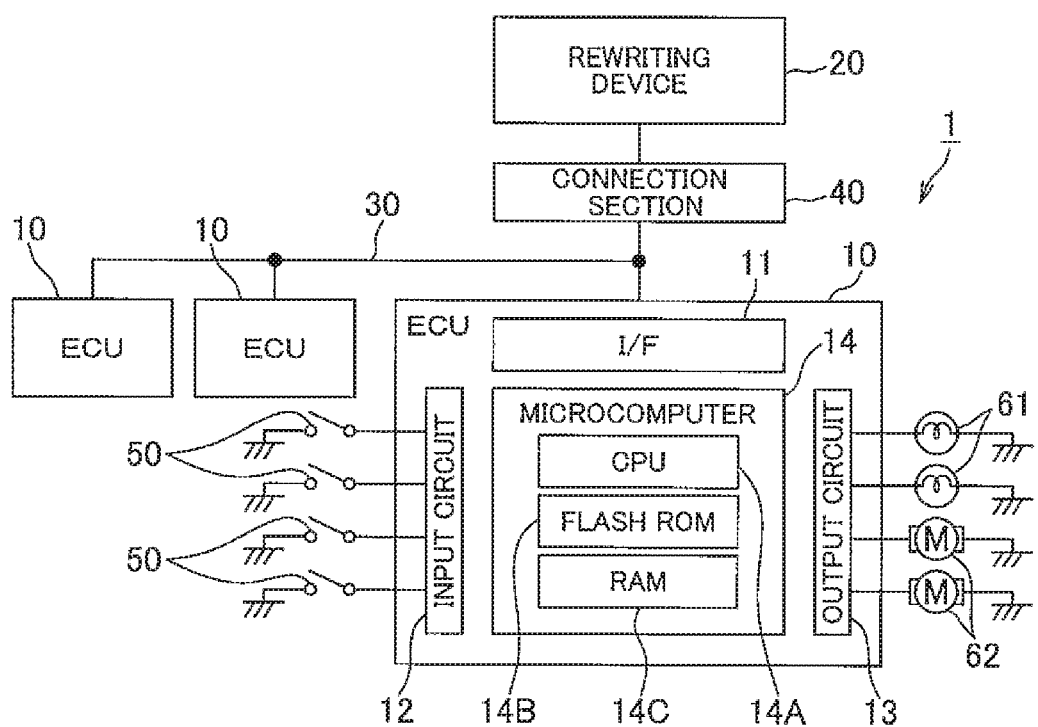
FIG. 1 is a block diagram showing an embodiment of a rewriting system of the present invention.
Figure 2:
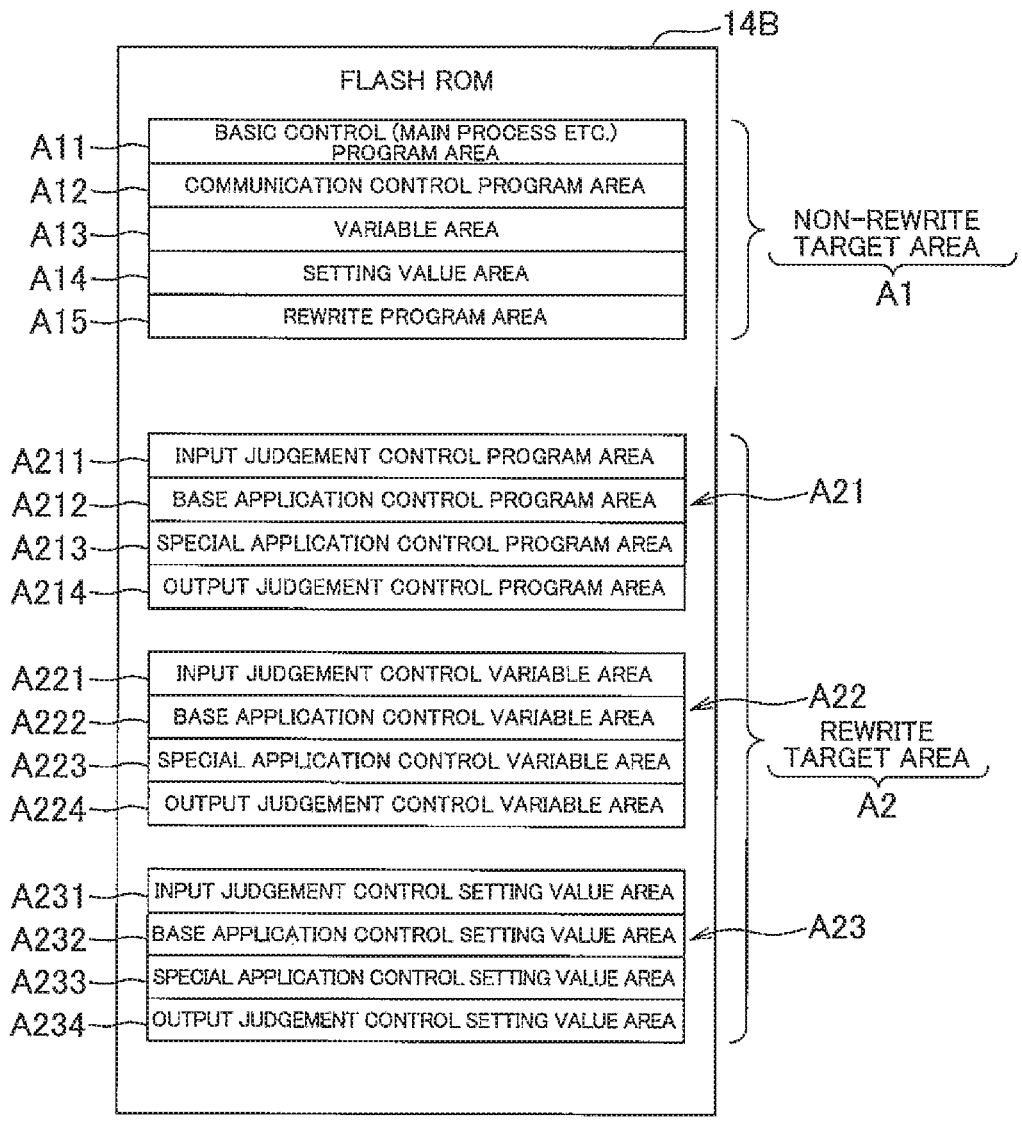
FIG. 2 is a block diagram showing the configuration of a flash ROM of the ECU shown in FIG. 1 in the first embodiment.

A first embodiment of the present invention will now be described with reference to FIGS. 1 and 2. FIG. 1 is a block diagram showing an embodiment of a rewriting system of the present invention. FIG. 2 is a block diagram showing the configuration of the Flash ROM of an ECU shown in FIG. 1.

The rewriting system 1 of the present invention is provided with a plurality of ECUs 10 (computers) and a rewriting device 20 for rewriting a program of the ECUs 10. The plurality of ECUs 10 is arranged in various parts of the vehicle, and communicably connected with each other via communication line 30. In the present embodiment, the plurality of ECUs 10 is bus-connected via the communication line 30 so as to be able to communicate with each other. The communication line 30 is provided with a connecting portion 40a for detachably connecting the rewriting device 20.

Each of the plurality of ECUs 10 has an interface (hereinafter referred to as I/F) 11, an input circuit 12, an output circuit 13, and a micro computer (hereinafter referred to as a microcomputer) 14. The I/F 11 is a communication interface for communicating with other ECU 10 and the rewriting device 20. In this embodiment, the I/F 11 is the interface capable of inputting and outputting signals corresponding to various types of communication (CAN, LIN, and other communication methods).

The input circuit 12 is a circuit to which a signal from a local switch (hereinafter referred to as a "local SW") 50 is input. In FIG. 1, only the signal from the local SW 50 is input to the input circuit 12, but it is not limited to this, and A/D input or PWM input, etc., may be input in which the output of various sensors is subjected to A/D conversion.

The output circuit 13 is a circuit to which a load such as a valve 61 or a motor 62 is connected. In FIG. 1, the output circuit 13 is only connected to the valve 61 and the motor 62, but is not limited to this, and a load mounted on the vehicle may be connected.

The microcomputer 14 includes a central processing unit (CPU) 14A, a flash ROM (read only memory) 14B, and a RAM (random access memory) 14C. The CPU 14A controls the overall control of the ECU 10, and perform various types of processing. The flash ROM 14B (memory) is a memory for storing programs, etc. to be executed by the CPU 14A. The RAM 14C is a memory including a work area used for various processing in the CPU 14A and a data memory area in which various data is stored.

As shown in FIG. 2, the flash ROM 14B has two areas of a non-rewrite target area A1, and rewrite target area A2.

In the non-rewrite target area A1 memory contents (program, variable, and setting value) that are not intended to be rewritten are stored. In the present embodiment, the non-rewrite target area A1 has a basic control program area A11, a control program area A12, a variable area A13, a setting value area A14, and a rewrite program area A15.

The basic control program area A11 stores a basic program for periodic execution of various programs. The communication control program area A12 stores a communication program for executing communication processing such as CAN and LIN. The variable area A13 stores a variable necessary for executing each program within the area. The setting value area A14 stores a setting value necessary for executing each program within the area (threshold value, minimum value, maximum value, value to be used for conditional branching, count value, initial value, etc.). The rewrite program area A15 stores a rewrite program for rewriting the rewrite target area A2.

The rewrite target area A2 stores memory contents to be written. In the present embodiment, the rewrite target area A2 is divided into three areas: a program area A21, a variable area A22, and a setting value area A23.

The program area A21 has an input judgment control program area A211, a base control program area A212, a special control program area A213, and an output judgment control program area A214.

The input judgment control program area A211 stores an input judgment program for performing an input judgment processing of communication via the I/F 11 and of an input through the input circuit 12. The base control program area A212 stores a base application program for executing load ON/OFF judgment processing in accordance with a result of the input judgment processing. The special application control program area A213 stores a special application program that is used when processing other than simple input judgment processing is required.

Here, the special program may be a program for performing a setting processing of a frequency and an on-duty ratio for PWM output from the output circuit 13, a calculation processing using an input analog data, a processing using a fixed value such as a threshold value, a minimum value, and a maximum value, a processing for determining ON/OFF of the load by a combination of several input judgment processing results, and a program for judging ON/OFF of several loads based on the input judgment processing result.

The output judgment control program area A214 also stores an output judgment program for executing the output judgment processing according to the result of the load ON/OFF judgment processing.

The variable area A22 has an input judgment variable area A221, a base application control variable area A222, a special application control variable area A223, and an output judgment control variable area A224.

The input judgment control variable area A221 stores a variable required to execute an input judgment processing according to the above input judgment program. The base application control variable area A222 stores a load ON/OFF judgment according to the above base application program. The special application control variable area A223 stores a variable required to execute a processing according to the special application control program described above. The output determination control variable area A224 stores a variable required to execute an output judgment processing according to the above output judgment program.

The setting value area A23 includes an input judgment control setting value area A231, a base control setting value area A232, a special application control setting value area A233, and an output judgment control setting value area A234.

The input judgment control setting value A231 stores a setting value necessary for executing the input judgment processing according to the above input judgment program. The base application control setting value area A232 stores a setting value necessary for executing a load ON/OFF judgement program according to the above base application program. The special application control setting value area A233 stores a setting value necessary for executing the special application control program. The output judgment control setting value area A234 stores a setting value necessary for executing an output judgment processing according to the above output judgment program.

The rewriting device 20 has a not-shown microcomputer. The microcomputer includes well-known CPU, ROM, and RAM. The rewriting device 20 has a storage device that is not shown, and a plurality of rewrite data is stored in the storage device. Each of the plurality of rewrite data contains an address data indicating an area of the flash ROM 14. By checking this address data, the area to which the data is written is determined to be any one of areas of the program area A21, the variable area A22, and the setting value area A23.

The storage device stores ID (identification information) of the ECU 10 to be rewritten for each rewrite data, thereby determining to which ECU 10 the rewrite data should be transmitted.

Next, the operation of the rewriting system 1 having the above-described configuration will be described below with reference to a flowchart of FIG. 3.

Figure 3:
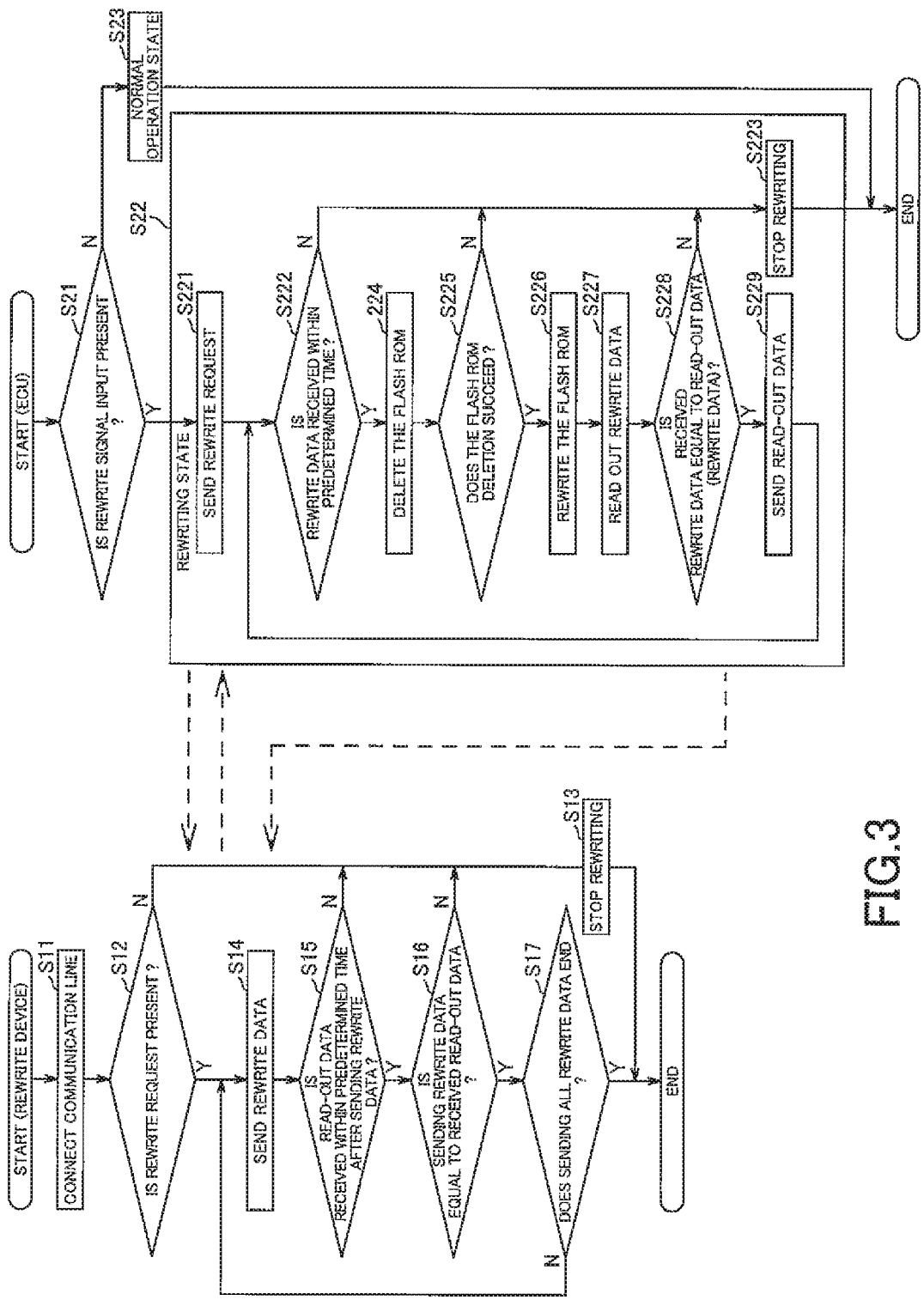
FIG. 3 is a flowchart showing the operation of the rewriting system shown in FIG. 1 and FIG. 2.

FIG. 3 is the flowchart showing the operation of the rewriting system shown in FIG. 1 and FIG. 2.

In the processing represented by this flowchart, the worker first connects the rewriting device 20 to the connection unit 40 provided in the communication line 30 (S11). The CPU of the rewriting device 20 (hereinafter simply referred to as the rewriting device 20) starts the rewrite processing in response to the connection to the communication line 30.

The operator also operates the local SW 50 of the rewrite target ECU 10 to input a rewrite signal to each ECU 10. The CPU 14A of each ECU 10 (hereinafter, simply referred to as the ECU 10) starts processing according to power supply. When the rewrite signal is input from the local switch SW 50 (Y in step S21), the ECU 10 activates rewrite processing (step S22) and ends the processing.

On the other hand, if the rewrite signal has not been input from the local switch 50 (N in step S21), the ECU 10 starts the normal processing (step S23) and ends the processing.

In step S22, the ECU 10 transmits a rewrite request (step S221). The ECU 10, when not receiving the rewrite request within the predetermined time after executing the rewrite processing (N in step S12), stops rewriting (step S13), and terminates the rewrite processing.

The rewriting device 20, when receiving a rewrite request within the predetermined time after executing the rewrite processing (Y in step S12), reads the rewrite data written in the not-shown storage device. The rewriting device 20 then transmits the rewrite data to the ECU 10 that has transmitted the rewrite request (step S14).

In this embodiment, when the ECU 10 is newly to be installed, the rewriting device 20 reads and transmits the rewrite data for all of the rewrite target area A2. At the time of deviation with change or addition of the drive load, the rewriting device 20 reads and transmits the write data targeted for the corresponding program area in the program area A21, the corresponding variable area in the variable area A22, and the corresponding setting value area in the setting value area A23. At the time of change for a judgment value or a threshold value to be used for processing of any program, or a valuable or a setting value such as a software filter count or a timer counter value, the rewriting device 20 reads and transmits the following rewrite data: In this case, the rewriting device 20 reads and transmits the rewrite data corresponding to the corresponding valuable area in the valuable area A22, or the corresponding setting value area A23. Thus, the rewriting device 20 reads out the corresponding data and transmits it as rewrite data in order to rewrite data of one or more arbitrary data of the program of the program area A 21, the variable of the variable area A 22, and the setting value of the setting value area A 23. At this time it is also possible to read out and transmit it by combining the data to be rewritten in a plurality of areas. In the present embodiment, the rewriting device 20 transmits the rewrite data selected and read out, in a unit data or a plurality of data corresponding to one area.

On the other hand, after transmitting the rewrite request (step S221), the ECU 10 determines whether or not the rewrite data is received within the predetermined time (step S222).

The ECU 10 ends the rewrite processing (step S223) if the rewrite data is not received (N in step S223). On the contrary, the ECU 10 deletes the relevant area of the flash ROM 14B corresponding to the address data included in the received rewrite data (step S224).

As described above, the rewriting device 20 arbitrarily selects the rewrite target according to the situation, and transmits the rewrite data. In step S224, the area corresponding to the address data included in the write data that is selected and transmitted in the rewriting device 20 is deleted.

Next, the ECU 10 judges whether or not the deletion of the flash ROM 14B has succeeded (step S225). In step S225, the ECU 10 reads the relevant area, and the deletion is successful if 1 is written, the deletion is failure if 0 is written (YES in step S225). The ECU 10 terminates the rewrite processing (step S223) if the deletion of the flash ROM 14B is unsuccessful (N in step S225).

On the other hand, when the deletion of the corresponding flash ROM 14B is successful (Y in step S225), the ECU 10 rewrites the data by writing the received rewrite data in the corresponding area (step S226). Then the ECU 10 reads the relevant area (Step S227) in order to determine whether the data is successfully rewritten. Next, the ECU 10 determines rewriting is successful if the data read from the corresponding area is the same as the received data, and or the data has failed to be rewritten (Step S228) if different.

In step S228, the ECU 10 determines whether the rewrite succeeds or fails. If the rewrite fails (N in step S228), the ECU 10 ends the rewrite processing (step S223).

On the other hand, if the rewriting is successful (Y in step S228), the ECU 10 transmits the read data from the corresponding area to the rewriting device (step S229), and the processing returns to step S222 to prepare to receive the next rewrite data. In the second and subsequent steps S222, the ECU 10 determines whether or not the rewrite data has been received within the predetermined time after transmitting the read data.

After the rewriting device 20 transmits the rewrite data (step S14), the rewriting device 20 judges whether or not the read data is received within the predetermined time (step S15).

If the read data is not received within the predetermined time (N in step S15), the rewriting device 20 ends the rewrite processing (step S13). Whereas if the read data is received (Y in step S15), the ECU 10 determines whether or not the rewriting has succeeded by comparing the transmitted rewrite data with the received read data (step S16).

In step S16, the rewriting device 20 determines that the rewriting was successful if the received rewrite data is the same as the rewrite data that was transmitted, and determines that the rewriting failed if different. If rewriting failed (N in step S16), the rewriting device 20 ends the rewrite processing (step S13). On the one hand, rewriting is successful (Y in step S16), the rewriting device 20 judges whether or not the transmission of all the rewrite data has been completed (step S17). When the transmission of all the replacement data is completed (Y in step S17), the rewrite processing ends.

On the other hand, if there unreceived rewrite data remains (N in step S17), the processing returns to step S14 and the next rewrite data is transmitted.

With the rewriting system 1, the rewriting device 20 and the ECU 10 of the present embodiment described above, only the memory contents of the rewrite target area A2 in the flash ROM 14B the ECU 10 has are rewritten, thereby reducing the rewrite time.

According to the present embodiment, since only the data selected by the rewriting unit 20 is rewritten on the memory contents of the rewrite target area A2, the rewrite time can be further shortened.

It is to be understood that the above-described embodiments are merely representative examples and are not to be construed as limiting the scope of the present invention. The above-described rewriting system, rewriting device, and computer can be varied and implemented without deviating from the scope of the present invention. Even such a modification is of course also included in the category as long as it has the essential constitution of the above-mentioned rewriting system, rewriting device, and computer.

For example, in the above-described embodiment, the ECU 10 having the flash ROM 14B is exemplified as an example of a computer having the memory described in the present invention. The computer having the memory in the present invention, however, is not limited to this, and it should not be required for its concrete form.

In the above-described embodiment, as examples of the memory contents of the non-rewrite target area in the present invention the basic control program, the communication control program, and the variables and the setting values necessary for executing each program are illustrated. In addition, as an example of the contents stored in the area to be rewritten in the present invention, the input judgment control program, the base application control program, the special application control program, the variables and the setting values required for executing each program are illustrated. However, the storage contents of the area to be rewritten in the present invention and the contents of the area to be rewritten in the present invention are not limited to these and can be appropriately set.

In the above-described embodiment, as an example of the rewriting device in the present invention, the rewriting device 20 is illustrated which an arbitrary one or more pieces of data in the memory contents of the rewrite target area A2 are selected in accordance with the situation and are transmitted to the ECU 10 in order to rewrite. The rewriting device in the present invention is not limited to this example but may transmit the entire contents of the rewritten area A2 to be rewritten regardless the situation for example. However, as mentioned above, selecting and sending one or more pieces of data makes it possible to further shorten the rewrite time.

In the above-described embodiment, an example of the rewriting system in the present invention is illustrated as an example the rewriting system 1 in which the rewriting device 20 transmits rewrite data and the ECU 10 receives the rewrite data and rewrites the data. The rewriting system in the present invention is, however, not limited to this, and the rewriting device 20 may be a system also for rewriting.

Second Embodiment

The second embodiment of the present invention will be described below. A configuration of the rewriting system 1 in the second embodiment is the same as that of the first embodiment shown in FIG. 1, and a detailed description thereof will therefore be omitted here.

Figure 4:
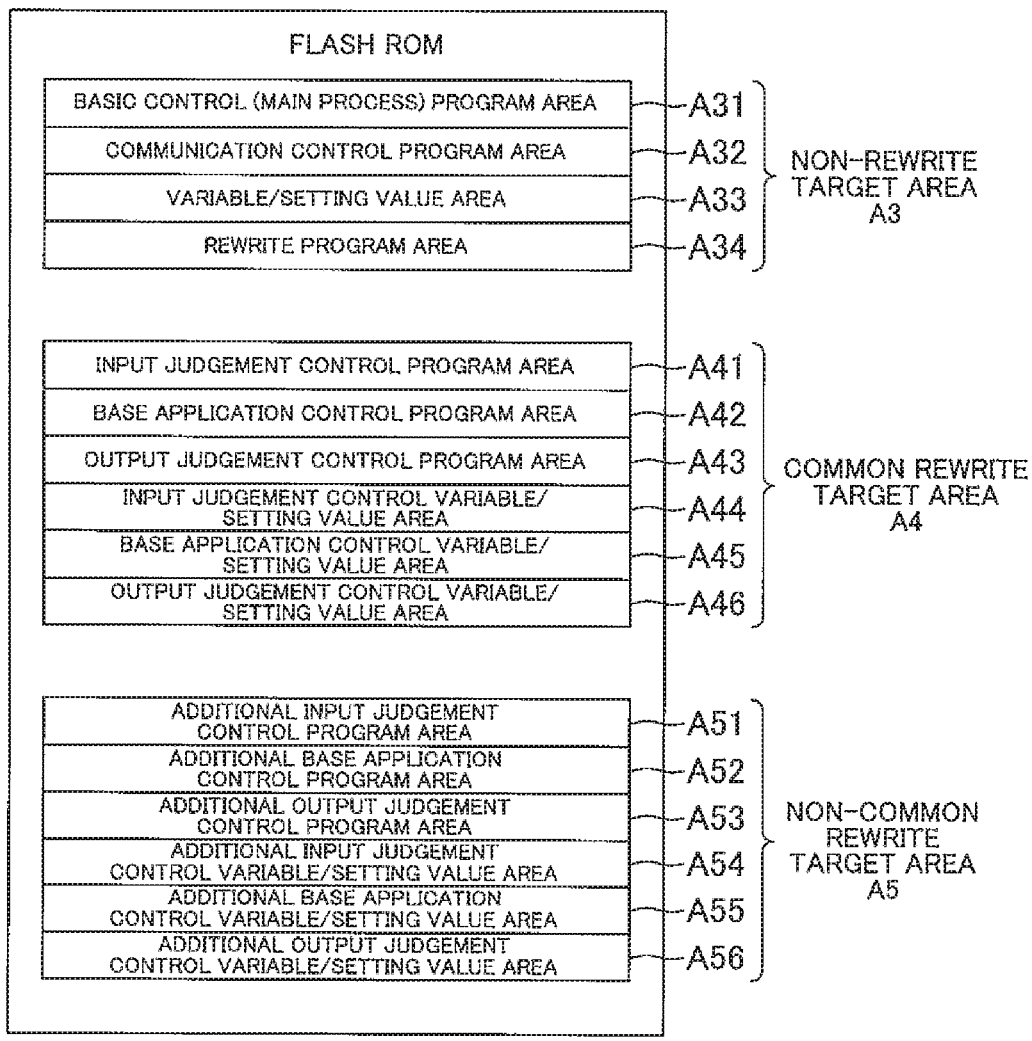
FIG. 4 is a block diagram showing the configuration of the flash ROM of the ECU shown in FIG. 1 in the second embodiment.

As shown in FIG. 4, the flash ROM 14B has three areas: a non-rewrite target area A3, a common rewrite target area A4, and a non-common rewrite target area A5.

The area A3 stores memory contents (program or setting value) which is not intended to be rewritten. In the present embodiment, in the area A3 for rewriting, a basic control program area A31, a communication control program area A32, a variable/setting value area A33, and a rewrite program area A34 are formed.

The basic control program area A31 stores a basic program for periodic execution of various programs. The communication control program area A32 stores a communication program for performing communication processing such as CAN and LIN. The variable/setting value area A33 stores variable and setting value (threshold value, minimum value, maximum value, value used for conditional branching, counter value, initial value, etc.) required to execute each program in the area. The rewrite program area A34 stores a rewrite program for executing the rewrite processing for the common rewrite target area A4 and the non-rewrite target area A5.

The common rewrite target area A4 stores the common memory contents (program and setting value) common to the plurality of ECUs 10. The common rewrite target area A4 stores an input judgment control program area A41, a base control program area A42, an output judgment control program area A43, an input judgment control variable and setting value area A44, a base control variable and setting value area A45, and an output judgment control variable and setting value area A46.

The input judgment control program area A41 stores an input judgment program for performing communication via I/F 11, and executing input judging processing of input via the input circuit 12. The base control program area A42 stores a base application program for executing load ON/OFF judgment processing according to the result of the input judgment processing. The output judgment control program area A 43 stores an output judgment program for executing output judging processing according to the result of the load ON/OFF judgment processing.

The input judgment control variable and setting value area A44 stores a variable and a setting value required to execute the input judging processing according to the above input judgment program. The base application program area A42 stores a variable and a setting value required to execute the load ON/OFF judgment processing according to the above base application program. The output judgment control variable and setting value area A 46 stores a variable and a setting value required to execute the output judgment processing according to the above output judgment program.

The non-common rewrite target area A5 stores non-common memory contents (program and setting value) which are non-common (different from each other) among the plurality of ECUs 10. The non-common rewrite target area A5 includes an additional input judgment control program area A51, an additional base application control program area A52, an additional output judgment control program area A53, an additional input judgment control variable and setting value area A54, an additional base application control variable and setting value area A55, and an additional output judgment control variable and setting value area A56.

The addition input judgment control program area A51 stores special program necessary for the input judgment processing besides the above input judgment program. As the special programs, there is a program to perform processing such as input addition and setting change of communication input via the I/F 11, or via the input circuit 12.

The additional base application control program area A52 also stores special program required for the load ON/OFF judgment processing besides the above base application program. As this special program corresponds to a program for executing processing of setting frequency and on-duty ratio when outputting PWM from the output circuit 13, calculation processing using the inputted analog data, processing using fixed value such as threshold value or maximum value, processing of judging ON/OFF of the load by combination of the several input judgment processing results, and processing of judging ON/OFF of the load by the input judgment processing result.

The additional output judgment control program A53 also stores a special program required for the output judgment processing besides the above output judgment control program. As this special program corresponds to a program for executing for performing processing such as addition or change for communication output through the I/F 11 and an output via the output circuit 13.

The additional input judgment control variable and setting value area A54, the additional base application control variable and setting value area A55, and the additional output judgment control variable and setting value area A56 sores a variable and a setting value necessary for executing the processing according to the program stored in the additional input judgment control program area A51, the additional base application control program area A52, and the additional output judgment control program area A53.

The rewriting device 20 has a not-shown microcomputer. The microcomputer has a well-known CPU, ROM, and RAM. The rewriting device 20 has a storage device that is not shown, and a plurality of rewrite data is stored in the storage device. Each of the plurality of rewrite data includes address data indicating the area of the flash ROM 14. Checking the address data enables to determine whether the rewrite target area is the common rewrite target area A4 or the non-common rewrite target area A5, or whether to be the program, or variable and setting value of any of the areas A4 and A5.

The ID (identification information) of the ECU 10 to be rewritten is stored in the storage device for each rewrite data. Thus, it should be understood to which the ECU 10 the rewrite data should be transmitted.

The storage device stores the rewritten data of the area A4 to be rewritten in the common rewrite area in the fastest area read out by the rewriting device 20, and thereafter the rewritten data of the non-rewritten rewrite target area A5 is stored.

Next, the operation of the rewriting system 1 having the above-described configuration will be described with reference to the flowcharts of FIGS. 5 to 8. First, the operator connects the rewriting apparatus 20 to the connection unit 40 provided in the communication line 30. The CPU of the rewriting device 20 (hereinafter simply referred to as the rewriting device 20) starts the rewrite processing of FIG. 6 to FIG. 8 in accordance with the connection to the communication line 30.

The operator operates the local SW 50 of the rewrite target ECU 10 to input a rewrite signal to each ECU 10. The CPU 14A of the ECU 10 (hereinafter simply referred to as the ECU 10) starts the processing of FIG. 5 according to power supply. The ECU 10 activates the rewrite processing (step S2) when inputting a rewrite signal from the local switch 50 (Y in step S1), and ends the processing.

On the other hand, if the rewrite signal has not been input from the local switch SW 50 (N in step S1), the ECU 10 determines whether or not a rewrite request from another ECU 10 transmitted in step S301 of the rewrite processing to be described later is received (Step S3). If the ECU 10 has not received the rewrite request from the other ECU 10 (N in Step S3), the ECU 10 starts the normal processing (step S4) and ends processing.

On the other hand, if the ECU 10 receives a rewrite request from another ECU 10 (Y in step S3), the ECU 10 does not activate both the rewrite processing and the normal processing, and immediately terminates the processing. That is, if there is at least one ECU 10 to which the rewrite signal is input from the local SW 50 among the plurality of ECUs 10 connected to the line 30, the ECU 10 to which the rewrite signal is not received does not perform communication processing (transmission/reception processing). Alternatively, the ECU 10 does not perform any processing that affects other ECUs 10.

Figure 6:
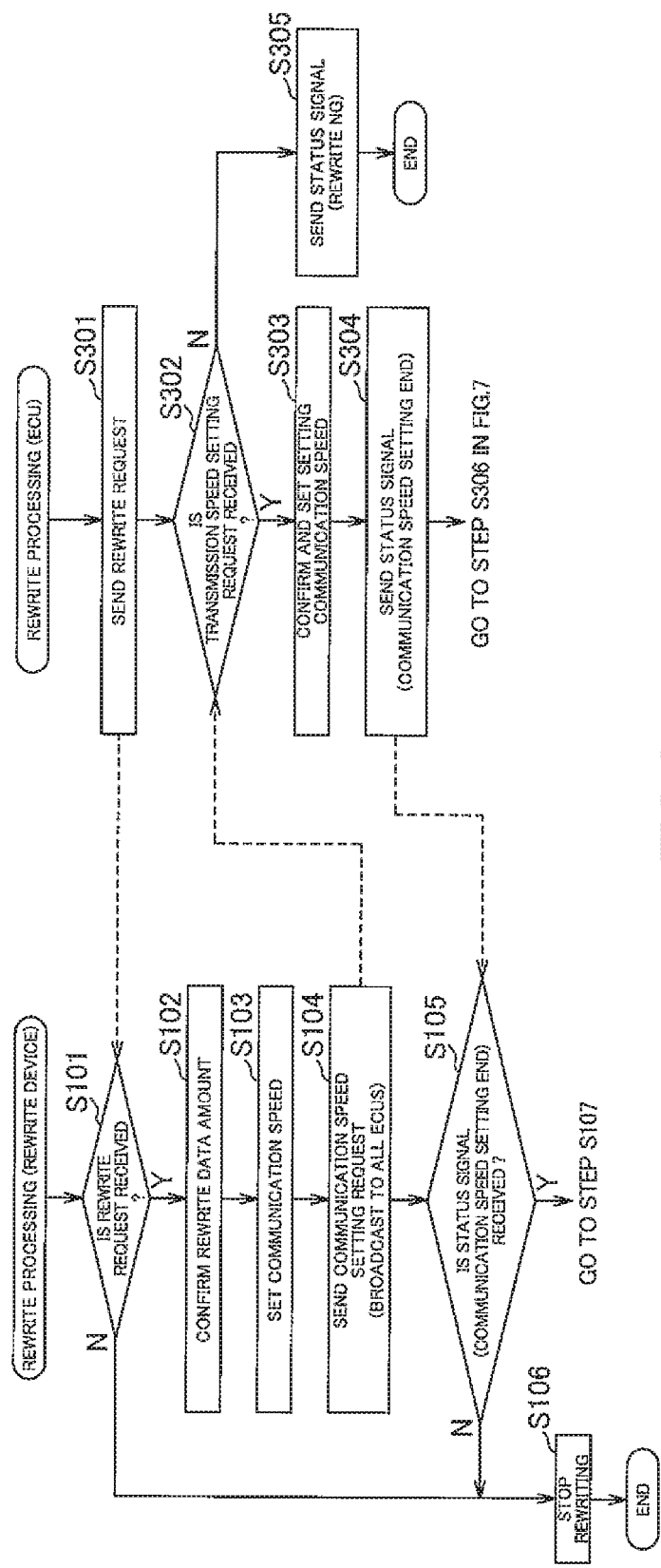
FIG. 6 is a flowchart showing a processing procedure of a rewriting device and the ECU shown in FIG. 1.

In the rewrite processing as shown in FIG. 6, the ECU 10 transmits a rewrite request including rewriting contents and a location of rewriting (step S301). The rewriting device 20 cannot receive a rewrite request from the ECU 10 within the predetermined time after the rewrite processing is executed, or a status signal that rewriting to be described later cannot be performed (hereinafter, referred to as status signal (rewrite NG)) is received (N in step S101), rewriting is stopped (step S106), and the rewrite processing is terminated.

When the rewriting device 20 receives the rewrite request from the ECU 10 within the predetermined time after performing the rewrite processing (Y in step S101), the rewriting device 20 checks the rewrite data amount of the rewritten target ECU 10 (step S102). The rewriting device 20 then sets a communication speed and a transmission period in accordance with the amount of rewrite data (step S103).

In the present embodiment, the rewriting device 20 stores a table of the communication speed and the transmission period for the rewrite data amount shown in Table 1 below, and sets the communication speed and the transmission period according to the table.

TABLE 1

| REWRITE DATA AMOUNT | CAN | | Lin | |
|---|---|---|---|---|
| | communication speed (bps) | transmission period (ms) | communication speed (bps) | transmission period (ms) |
| ~1 kbyte | 125k | 1 | 4.8k | 35 |
| 1 kbyte~10 kbyte | 125k | 1 | 4.8k | 35 |
| 10 kbyte~100 kbyte | 500k | 0.5 | 9.6k | 35 |
| 100 kbyte~1 Mbyte | 500k | 0.5 | 9.6k | 25 |
| 1 Mbyte~10 Mbyte | 500k | 0.5 | 9.6k | 25 |
| 10 Mbyte~100 Mbyte | 1M | 0.1 | 19.2k | 20 |

TABLE 1-continued

| REWRITE DATA AMOUNT | CAN | | Lin | |
|---|---|---|---|---|
| | communication speed (bps) | transmission period (ms) | communication speed (bps) | transmission period (ms) |
| 100 Mbyte~1 Gbyte | 1M | 0.1 | 19.2k | 20 |
| 1 Gbyte~ | 1M | 0.1 | 19.2k | 20 |

In the example shown in Table 1, as the amount of rewrite data becomes larger, the transmission speed becomes faster and the transmission period becomes shorter.

Thereafter, the rewriting device 20 sends a broadcast message to all the ECUs 10 (i.e., all the ECUs 10 to which the rewrite signal is input) to which the communication speed setting request is to be rewritten (step S104). Data indicating the communication speed and transmission period set in step S103 are included.

After transmitting the rewrite request (step S301), if the rewriting device 20 cannot receive the communication speed setting request within the predetermined time (N in step S302), the ECU 10 transmits the status signal (rewrite NG) and ends the rewrite processing. On the other hand, when the ECU 10 receives the communication speed setting request within the predetermined time from the rewriting device 20 (Y in step S302), the ECU 10 then determines whether the communication speed the transmission period included in the communication speed setting request and sets them (step S303). After that, the ECU 10 transmits a status signal indicating that the setting of the communication speed is completed (hereinafter referred to as a status signal (communication speed setting end)) to the rewriting device 20 (step S304), and the processing proceeds to step S306 of FIG. 7.

The rewriting device 20 cannot receive the status signal (communication speed setting end) from all the ECUs 10 to be rewritten after the transmission speed setting request is transmitted (step S104), or when the status signal (rewrite NG) (N in step S105) is received, the rewriting is stopped (step S106), and the rewrite processing is terminated.

Figure 7:
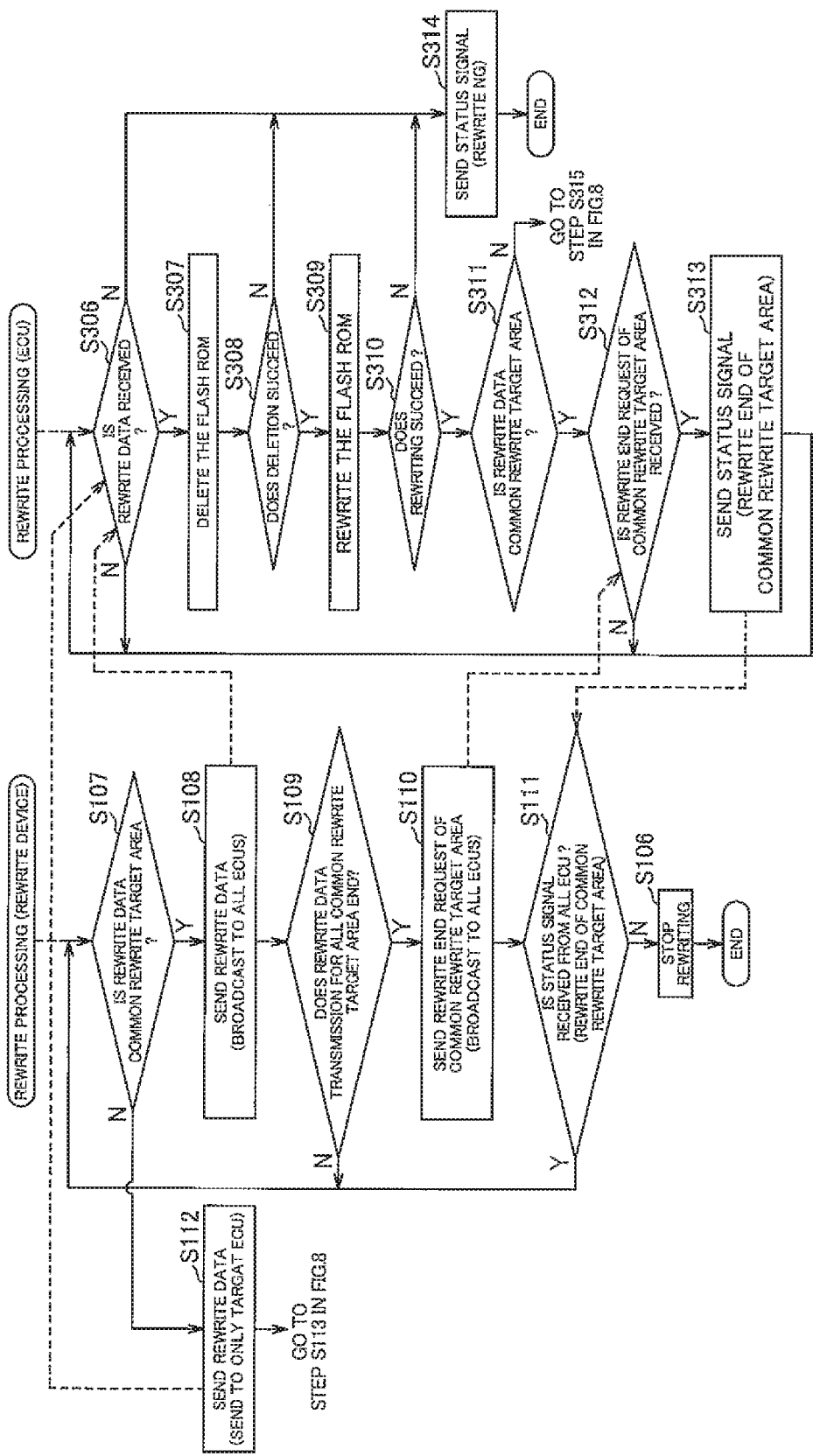
FIG. 7 is a flowchart showing a processing procedure of a rewriting device and the ECU shown in FIG. 1.

On the other hand, if the status signal (communication speed setting end) is received from all the ECUs 10 to be rewritten within the predetermined time (Y in step S105), the rewriting device 20 proceeds to step S107 in FIG. 7.

In step S107 of FIG. 7, the rewriting device 20 reads the rewrite data written in the not-shown storage device, and judges from the address data of the flash ROM 14B included in the rewrite data whether the rewrite target area is the common rewrite target area A4 (Y in step S107). The rewriting device 20 broadcasts the rewrite data to all the ECUs 10 (step S108) in the case of the common rewrite target area A4 (Y in step S107).

If the rewriting device 20 has not completed the transmission of all the rewrite data of the common rewrite target area A4 among the plurality of rewrite data stored in the storage device (N in step S109), the processing returns to step S107. When returning to step S107, the rewriting device 20 reads out the next rewrite data and determines whether or not it is the common rewrite target area A4. The rewriting device 20 determines Y in step S107 during judge of N in step S109.

On the other hand, when the transmission of all the rewrite data in the common rewrite target area A4 is completed (Y in step S109), the rewriting unit 20 broadcasts the rewrite end request for the common rewrite target area A4 to all the ECUs 10 (step S110).

On the other hand, after transmitting the status signal (communication speed setting end) (step S304 in FIG. 6), the ECU 10 determines whether or not the rewrite data has been received within the predetermined time and whether or not the communication speed setting has been successful (step S306). The success of the setting of the communication speed is determined as follows: The ECU 10, if the rewrite data received from the rewriting device 20 has been transmitted within the predetermined time at the set communication speed, judges that the setting of the communication speed is successful and if it is not transmitted at the set communication speed, judges that the setting of the communication speed has failed.

If the rewrite data cannot be received within the predetermined time or the communication speed setting fails (N in S306), the ECU 10 transmits the status signal (rewrite NG) to the rewriting device 20 (step S314) and ends the rewrite processing. On the other hand, the ECU 10, if receiving all of the rewrite data destined for the ECU 10 or itself and if the setting of the communication speed is successful (Y in S306), the ECU 10 deletes the corresponding area of the flash ROM 14B corresponding to the address data included in the rewrite data received (step S307).

In this case, if it is the rewrite data of the common rewrite target area A4, the common rewrite target area A4 is indicated as the address data, and if it is the rewrite data of the non-common rewrite target data area A5, the rewrite data of the non-common rewrite target data area A5 is indicated as the address data.

Next, the ECU 10 judges whether or not deletion of the flash ROM 14B succeeds or fails (step S308). In step S308, the ECU 10 reads the corresponding area, and the ECU 10, if 1 is written, determines the deletion of the flash ROM 14B has succeeded, and, if 0 is written, determines the deletion has failed. The ECU 10 transmits the status signal (rewrite NG) to the rewriting device 20 (step S314) if the deletion the area of the corresponding flash ROM 14B is not successful (N in step S308) before the processing is terminated.

On the other hand, when the deletion of the area of the corresponding flash ROM 14B is successful (Y in step S308), the ECU 10 rewrites the data by rewriting the rewrite data received in the corresponding area (step S309). Next, the ECU 10 judges that the rewrite is successful (step S310). In step S310, the ECU 10 reads the corresponding area and judges that rewriting succeeds if the rewrite data is the same as the received rewrite data, or rewriting fails if not.

In this step S310, the rewrite target ECU 10 judges success or failure of the rewriting, respectively. Thus the judgement whether the rewrite succeeds or fails in the ECU 10 as described above reduces the processing time and prevents the processing of the rewriting device 20 from being complicated. If the rewriting fails (N in step S310), the ECU 10 transmits the status signal (rewrite NG) to the rewriting device 20 (Step S314), and the processing is terminated.

On the other hand, if the rewrite is successful (Y in step S310), the ECU 10 determines whether the address data included in the rewrite data is the common rewrite target area A4 (step S311). If it is the common rewrite target area A4 (Y in step S311), the ECU 10 determines whether or not a rewrite end request has been received from the rewriting device 20 (step S312).

If the rewrite end request is not received (N in step S312), the ECU 10 returns to step S306 to receive the next rewrite data. On the other hand, if the ECU 10 receives the rewrite end request (Y in step S312), the ECU 10, after transmitting the status signal indicating the end of rewriting of the common rewrite target area A4 (hereafter referred to as status signal (end of rewriting of the common rewrite target area)) (step S313), returns to step S306 to receive the next rewrite data.

After the rewrite end request is transmitted (step S110), the rewriting device 20 judges whether or not the status signal (rewrite end of the common rewrite target area) is received from all the ECUs 10 to be rewritten (step S111). In step S111, the rewriting device 20 judges from the IDs of all the ECUs 10 stored as objects to be rewritten in the rewrite data of the common rewrite target area A3, and ID of the sender of the status signals. If not receiving or when the status signal is received (rewrite NG) (N in step S111), the rewriting device 20 aborts the rewriting (step S106), and ends the rewrite processing (step S107).

On the other hand, if received (Y in step S111), the rewriting device 20 returns to step S107. Upon returning to step S107, the rewriting device 20 reads the next rewrite data, and similarly judges whether or not it is the common rewrite target area A4. Note that when the rewriting device 20 returns to step S107 after determined to be Y in step S111, it determines N in step S107 because the rewrite data to be read next is the non-common rewrite target area A5.

Thereafter, the rewriting device 20 transmits the rewrite data to the ECU 10 to be rewritten of the rewrite data read in step S107 (step S112). According to this, when the ECU 10 receives the rewrite data addressed to itself (Y in step S306), the processing proceeds to steps S307 to S311 in the same manner and the rewriting of the non-common rewrite target area A5 of the flash ROM 14B is performed.

Figure 5:
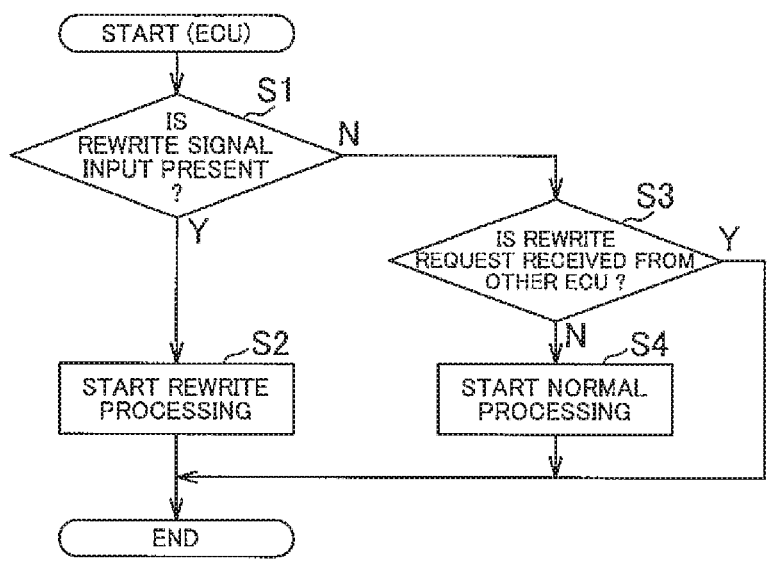
FIG. 5 is a flowchart showing a processing procedure of ECU shown in FIG. 1.

Then, the ECU 10 determines in the next step S311 that the area of the rewrite data is the non-common rewrite target area A5 (N in step S311), and the ECU 10 proceeds to step S315 in FIG. 5.

Figure 8:
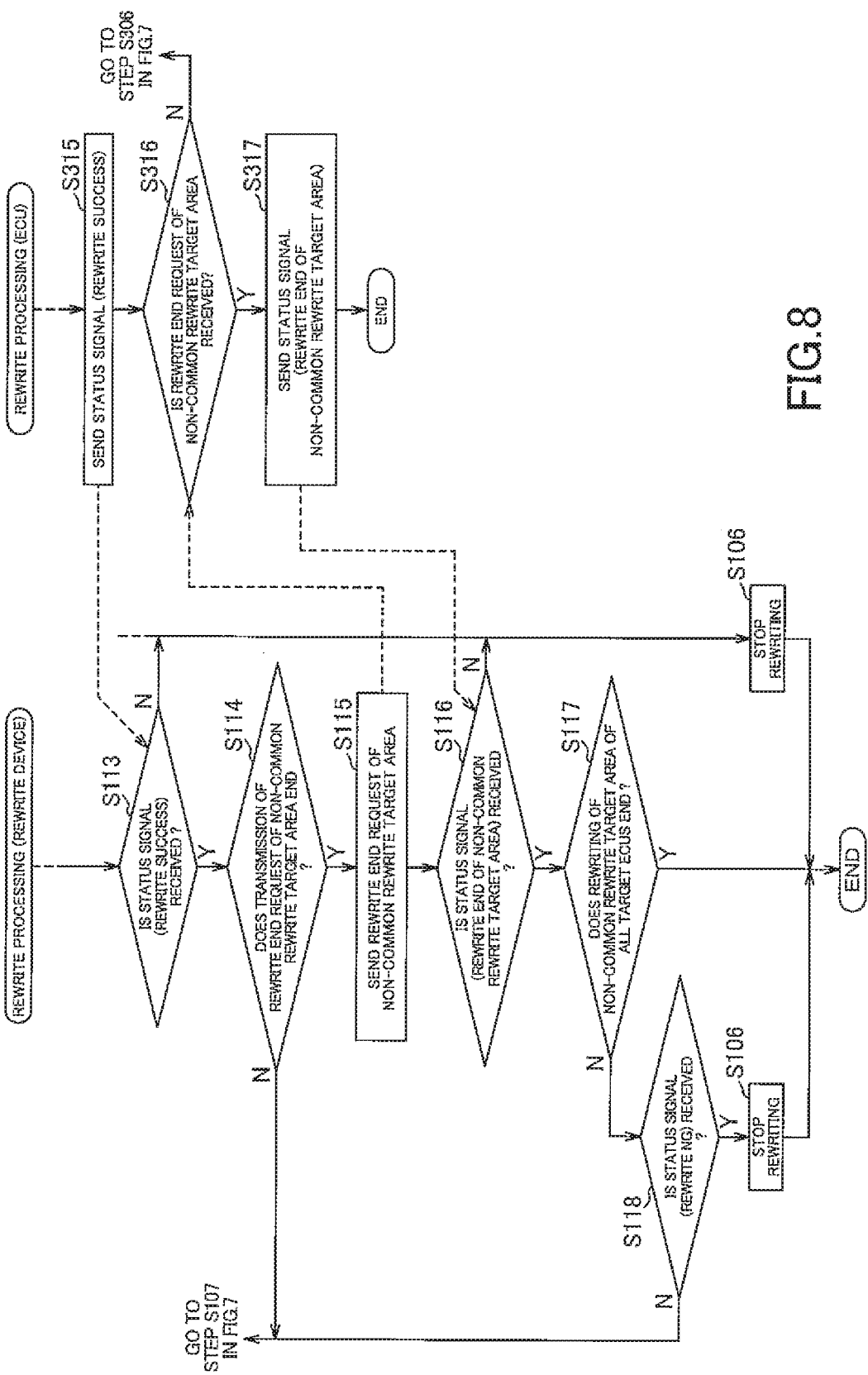
FIG. 8 is a flowchart showing a processing procedure of a rewriting device and the ECU shown in FIG. 1.

In step S113 of FIG. 8, the ECU 10 transmits a status signal (hereinafter referred to as a status signal (successful rewrite)) indicating the success of rewriting to the rewriting device 20. The rewriting device 20, after transmitting the rewrite data of the non-common rewrite target area A5 (step S112), proceeds to step S113 in FIG. 8.

In step S113, the rewriting device 20 determines whether or not a status signal (successful rewrite) has been received within the predetermined time (step S113). The rewriting device 20, if not receiving the status signal within the predetermined time (rewrite success) or receiving the status signal (rewrite NG) (N in step S113), the rewriting is stopped (step S106), and the rewrite processing is terminated. On the other hand, if the status signal (rewrite success) is received within the predetermined time (Y in step S113), the rewriting device 20 determines whether or not the transmission of all the rewrite data of the non-common rewrite target area A5 among the plurality of rewrite data stored in the storage device is completed (step S114).

The rewriting device 20 returns to step S107 if the transmission of all the rewrite data for which the rewrite target area is the non-common rewrite target area A5 has not been completed (N in step S114). When returning to step S107, the rewriting device 20 reads the next rewrite data and determines similarly whether or not it is the common rewrite target area A4. The rewriting device 20, while judging N in step S107, judges N in step S114.

When the transmission of all the rewrite data of the non-common rewrite target area A5 is completed (Y in step S114), rewrite transmission end request of the non-rewrite target area A5 is transmitted (step S115) for all the ECUs 10 to be rewritten in the non-common rewrite target area A5.

If the rewrite transmission end request of the non-common rewrite target area A5 cannot be received from the rewriting device 20 within the predetermined time after the status signal (successful rewriting) is transmitted (step S315) (N in step S316), the processing returns to step S306 of FIG. 7 and waits for the rewrite data to be received again. If the rewrite transmission end request of the non-common rewrite target area A5 is received from the rewriting device 20 within the predetermined time (Y in step S316), a status signal indicating that the rewriting of the common rewrite target area A5 has been completed (hereinafter, a status signal (rewriting end of the non-common rewrite target area)) is transmitted (step S317), and the writing processing is terminated.

The rewriting device 20, when the status signal (end of rewriting of the non-common rewrite target area) is received within the predetermined time (Y in step S116) after the rewrite end request for the non-common rewrite target area A5 is transmitted (Step S115), judges whether or not the status signal (end of rewriting of the non-common rewrite target area) is received from all the ECUs 10 to be rewritten in the non-common rewrite target area A5 within the predetermined time (step S117).

If the status signal (rewrite end of the non-common rewrite target area) is received from all the ECUs 10 (Y in step S117), the rewriting device 20 ends the rewrite processing. On the other hand, the status signal (rewrite end of the non-common rewrite target area) is not received from all the ECUs 10 (N in step S117), the rewriting signal determines whether or not the status signal (rewrite NG) is received (step S118).

If the status signal (rewrite NG) is received (Y in step S118), the rewriting device 20 stops rewriting (step S106) and ends the rewrite processing. On the other hand, if the status signal (rewrite NG) is not received (N in step S118), the rewriting device 20 returns to step S107 in FIG. 7. In step S118, after the determination in step S118 is N, when the processing returns to step S107, the rewriting device 20 again transmits the rewrite data of which the ECU 10 cannot receive the status signal (rewrite end of the non-common rewrite target area).

According to the embodiment described above, each of the plurality of ECUs 10 is provided with the common rewrite target area A4 in which common contents which are common to each other are stored, and the non-common rewrite target area A5 in which the non-common rewritten contents which are non-common to each other. And the rewriting device 20 sends the rewrite data of the common memory contents to the plurality of ECUs 10 at the same time (broadcasting), and sequentially sends the rewrite data of the non-common memory contents to the target ECU 10 to be rewritten. This makes it possible to rewrite the common rewrite target area A4 of the plurality of ECUs 10 at a time and shorten the rewrite time.

According to the embodiment described above, each of the plurality of ECUs 10 has a non-rewrite target area A3 in which the write contents not to be rewritten are stored. This makes it possible that the contents of the memory that are not required to be rewritten can be restored to the non-rewrite target area A3.

According to the above-described embodiment, the rewriting device 20 transmits at the communication speed corresponding to the data amount of the rewrite data, thereby further reducing the rewrite time.

According to the embodiment described above, the non-rewrite area A3 is provided in the flash ROM 14B, but the present invention is not limited to this case. The present invention may include the common rewrite target area A4 and the non-common target area A5 in the flash ROM 14B, requiring no installation of the non-rewrite area A3.

According to the above-described embodiment, the rewriting device 20 transmits data at the communication speed corresponding to the data amount of the rewrite data, but it is not limited to this. For example, the communication speed may be constant without depending on the data amount.

According to the above-described embodiment, the rewriting device 20 first transmits all the rewrite data in which the rewrite target area is the common rewrite target area A4, and then transmits all the rewrite data of the non-common rewrite target area A5, however, it is not limited to this. It is also possible to transmit first all the rewrite data of the non-common rewrite target area A5, and then send the rewrite data of the common rewrite target area A4.

Third Embodiment

Figure 9:
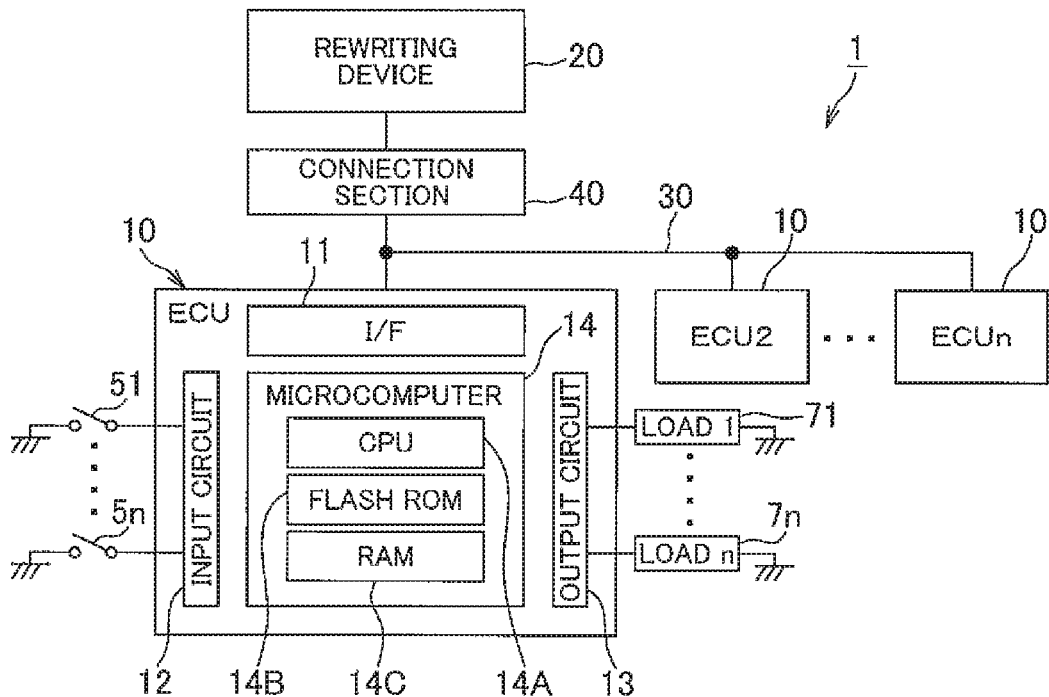
FIG. 9 is a block diagram showing the rewriting system of the present invention in the third embodiment.
Figure 10:
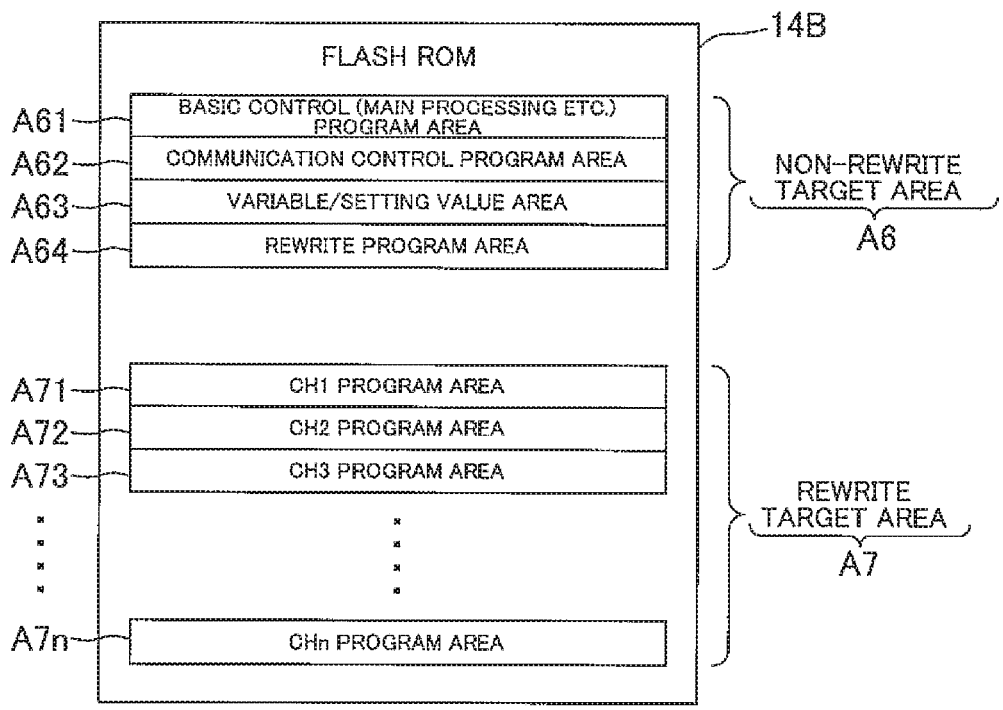
FIG. 10 is a block diagram showing the configuration of the flash ROM of the ECU shown in FIG. 9.

Hereafter, one embodiment of the present invention will be described with reference to FIGS. 9 and 10. FIG. 9 is a block diagram showing an embodiment of a rewriting system according to the present invention. FIG. 10 is a block diagram showing a configuration of a flash ROM of an ECU shown in FIG. 9. In the figures, the same parts as those already described in the first and second embodiments described above are denoted by the same reference numerals and the detailed description thereof is omitted, differences from the first and second embodiments will be described.

The input circuit 12 is a circuit to which signals from the CH1 to CHn local switches (hereinafter referred to as CH1 to CHn local SWs) 51 to 5n are input. In FIG. 9, the input signals from the CH1 to CHn local SW51 to 5n are input in the input circuit 12, but it is not limited to this, and A/D input or PWM input that output of various sensors is A/D-conversed may be input.

The output circuit 13 is a circuit to which the CH1 to CHn loads 71 to 7n are connected as various loads mounted on a vehicle such as a valve and a motor etc. The ECU 10 is a device for controlling these CH1 to CHn loads 71 to 7n. In the present embodiment, the CH1 to CHn loads 71 to 7n correspond to the CH1 to CHn local SW51 to 5n described above in a one-to-one correspondence.

As shown in FIG. 10, the flash ROM 14B has two areas: a non-rewrite target area A6 and a rewrite target area A7.

The rewrite target area A6 stores memory contents (program, variable, and setting value) not to be rewritten. In the present embodiment, the rewrite target area A6 includes a basic control program area A61, a communication control program area A62, a variable/setting value area A63, and a rewrite program area A64.

The basic control program area A61 stores a basic program for periodic execution of various programs. The communication control program area A 62 stores a communication program for performing communication processing such as CAN and LIN. The variable/setting value area A63 stores a variable and a setting value required to execute each program in the area. The setting values include a threshold value, a minimum value, a maximum value, a value used for a conditional branch, a counter value, an initial value, etc. The rewrite program area A64 stores a rewrite program to execute rewrite processing for rewrite target area A7.

The rewrite target area A7 stores memory contents to be rewritten. In this embodiment, the rewrite target area A7 is provided with channel 1 to channel n program areas (CH1 to CHn program areas) A71 to A7n. The CH1 to CHn program areas A71 to A7n correspond to the CH1 to CHn loads 71 to 7n in a one-to-one correspondence that are control targets. The memory contents each of which is used to control these CH1 to CHn program areas A71 to A7n is respectively stored in the CH1 to CHn program areas A71 to A7n. In the present embodiment, each CH1 to CHn program areas A71 to A7n stores an input judgment control program, a base application control program, an output judgment control program, and set variables and setting values corresponding to each program.

The input judgment control program is a program for performing communication judgment via the I/F 11 and input judging processing through the input circuit 12. The base application control program is a program for judging whether the load corresponding to the result of the input judgment processing is ON or OFF. And the output judgment control program is a program for executing the output judgment processing in accordance with the result of the load ON/OFF judgment processing.

The rewriting device 20 has a not-shown microcomputer. The microcomputer has a well-known CPU, ROM, and RAM. The rewriting device 20 has a storage device that is not shown, and a plurality of rewrite data is stored in the storage device. Each of the plurality of rewrite data includes address data that indicates the area of the flash ROM 14. By checking the address data, it is known which of the CH1 to CHn program areas A71 to A7n is the area to which the rewrite data is written.

In the present embodiment, the plurality of ECUs 10 is an equivalent device to each other including the above-described memory structure of the flash ROM 14B, whereby the rewriting device 20 can distinguish the plurality of ECUs 10 in particular and transmit the rewrite data to all the ECUs 10 as is to be described later.

Next, the operation of the rewriting system 1 having the above-described configuration will be described below with reference to the flowchart of FIG. 11.

Figure 11:
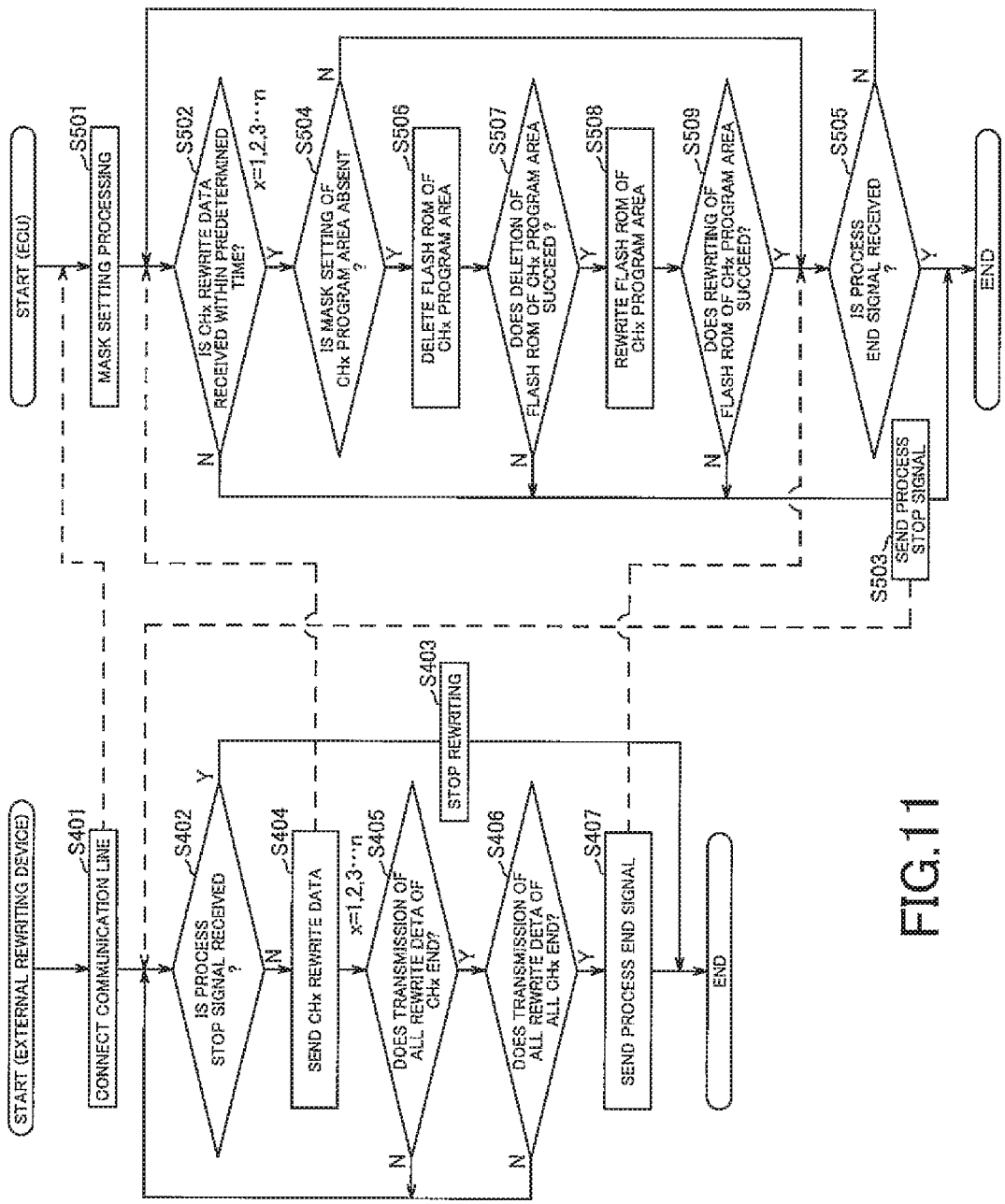
FIG. 11 is a flowchart showing an operation of the rewriting system shown in FIGS. 9 and 10.
Figure 12:
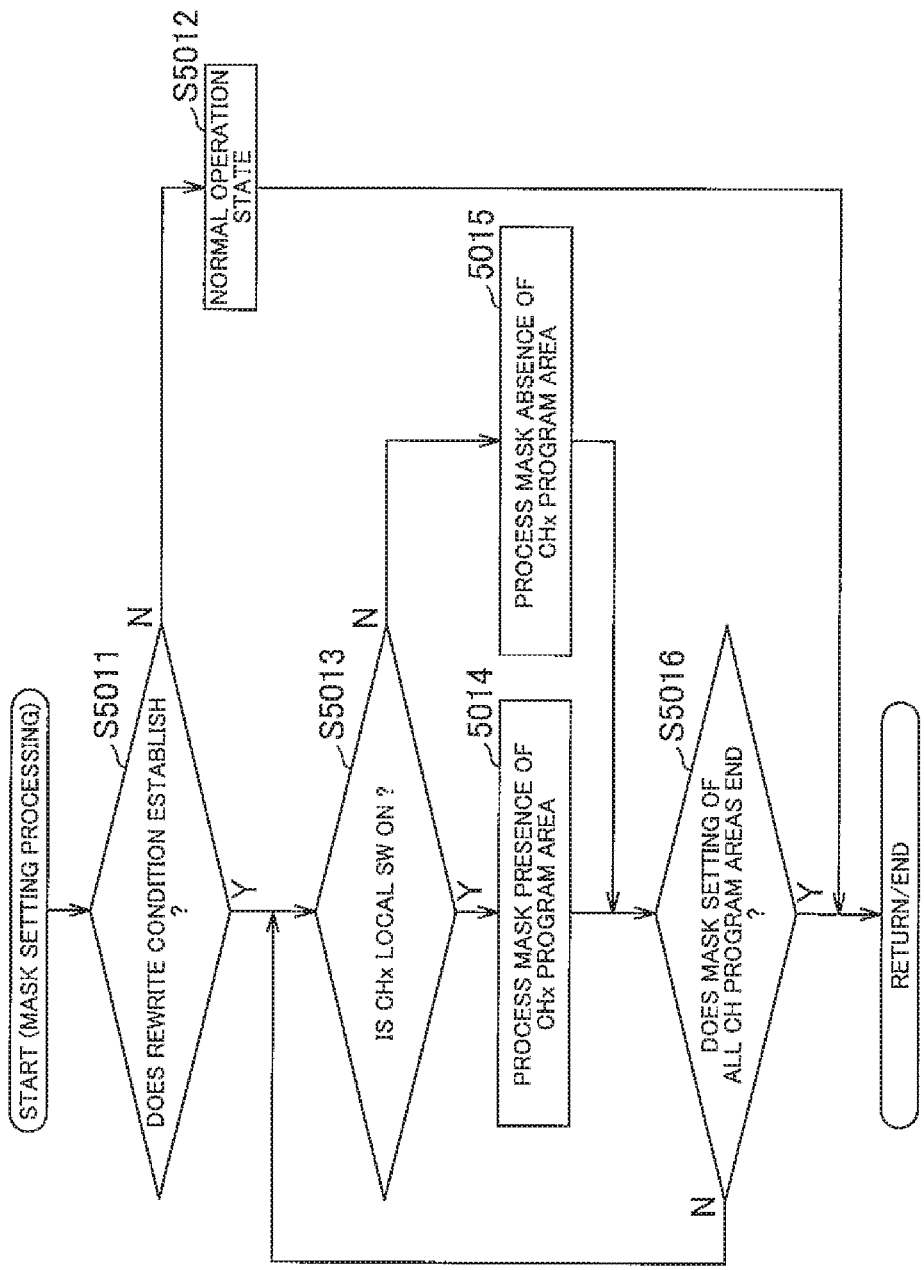
FIG. 12 is a flowchart showing a mask setting processing shown in FIG. 11.

FIG. 11 is a flowchart showing the operation of the rewriting system shown in FIGS. 9 and 10. FIG. 12 is a flowchart showing the mask setting processing shown in FIG. 11.

Here, in this embodiment, as the preparatory stage of the rewrite processing preceding the processing indicated by the flowcharts of FIGS. 11 and 12, the operator first operates the CH1 to CHn local SW51 to 5n of the plurality of ECUs 10. This action specifies a mask area for which rewriting is prohibited and a mask exclusion area for which rewriting is allowed in the CH1 to CHn program areas A71 to A7n in the Flash ROM 14B of each ECU 10. If the local switch is set to ON, the corresponding CH program area is assigned to the mask area, and conversely, if the local switch is set to OFF, the corresponding CH program area is designated as the mask exclusion area. If all of the CHn local SW51 to SW5n are set to ON, the ECU 10 itself is masked and become excluded from rewrite target.

After such preparatory stage passes, in the processing shown by flowchart in FIGS. 11 and 12, the operator first connects the rewriting unit 20 to the connection unit 40 provided in the communication line 30 (step S401). The CPU of the rewriting device 20 (hereinafter simply referred to as the rewriting device 20) starts the rewrite processing in accordance with the connection to the communication line 30. At the beginning of the start of the rewrite processing, the rewriting device 20 transmits the rewrite signal to each ECU 10, to notify the start of the rewrite processing.

On the other hand, the CPU 14A (hereinafter, simply referred to as the ECU 10) of each ECU 10 starts processing in accordance with the power supply. Each ECU 10 performs the following mask setting processing (step S501).

In the mask setting processing shown in FIG. 12, the ECU 10 first determines whether or not the rewrite condition is satisfied (step S5011). This determination is made by whether or not the rewrite signal is transmitted from the rewriting device 20. If the rewrite signal has been transmitted (Y in step S5011), the ECU 10 executes a series of processing of the mask setting processing. On the other hand, if the rewrite signal has not been transmitted (N in step S5011), the ECU 10 starts normal processing (step S5012), and ends the processing. The normal operation here is ON/OFF control for the CH1 to CHn loads 71 to 7n.

The determination as to whether or not the rewrite condition is satisfied is not limited to the determination based on the rewrite signal from the rewriting device 20 as in the present embodiment. The determination as to whether or not the rewrite condition may be performed based on a local signal from the outside of the ECU 10, or based on the operation of the dedicated switch provided in the ECU 10.

In the series of processing of the mask setting processing, the ECU 10 judges whether or not the local switch 5x of CHx (x is any one of 1 to n) is set to ON (step S5013). If the CHx local switch 5x is set to ON (Y in step S5013), the ECU 10 sets the corresponding CHx program area A2x to the mask target area for which the rewrite is prohibited (step S5014), whereas if the CHx local switch 5x is set to OFF (step S5013), the ECU 10 sets the corresponding CHx program area A2x to the mask exclusion area for which the rewriting is permitted (step S5015). Then the ECU 10 judges whether processing for all the CH1 to CHn program areas A71 to A7n is completed (step S5016). If there is an unprocessed program area (N in step S5016), the ECU 10 repeats the processing in steps S5013 to S5015. When all of the program areas have been processed (step S5016), the ECU 10 finishes the mask setting processing and returns to the flowchart shown in FIG. 11. In the ECU 10, the CPU 14A for executing the processing shown in FIG. 12 plays the role of a mask setting section that performs a mask setting processing.

In the processing shown in FIG. 11, the rewriting device 20 judges whether or not a processing stop signal is received from any of the plurality of ECUs 10 (step S402). When the processing stop signal is received (Y in step S402), the rewriting device 20 stops the rewrite processing (step S403), and terminates the processing. If the processing stop signal is not received (N in step S402), the rewriting device 20 transmits the CHx rewrite data to all the ECUs 10 (step S404). The rewrite data transmitted at this time is various programs, various variables, and various setting values stored in the CHx program area A2x. Every transmission of the rewrite data in step S404, the rewriting device 20 judges whether or not all rewrite data related to the CHx program area A2x is transmitted (step S405). If there is unreceived rewrite data (N in step S405), the rewriting device 20 repeats the processing of steps S402 to S404. When all the rewrite data has been transmitted (Y in step S405), the rewriting device 20 determines whether or not the rewrite data transmission has been completed for all of the CH1 to CHn program areas A71 to A7n (step S406). When there is rewrite data of a program area that has not yet been transmitted (N in step S406), the rewriting device 20 repeats the processing in steps S402 to S405. When the rewrite data transmission is completed for all the program areas (Y in step S406), the rewriting device 20 sends the processing end signal to all ECUs 10 (Step S407) to terminate the processing. By the above processing, the rewriting device 20 transmits the rewrite data for all the CH1 to CHn program areas A71 to A7n to all the ECUs 10 in order of CH1, CH2, . . . and CHn sequentially.

On the other hand, after the above-described mask setting processing (step S501), the ECU 10 determines whether or not CHx rewrite data is received from the rewriting device 20 within the predetermined time (step S502). If no CHx rewrite data is received after the predetermined time has lapsed (N in step S502), the ECU 10 transmits a processing stop signal to the rewriting device 20 (step S503) and ends the processing. On the other hand, when the CHx rewrite data is received (Y in step S502), the ECU 10 determines whether or not the corresponding CHx program area A2x is a mask exclusion area permitted to be rewritten (step S504). If the CHx program area A2x is a mask target area in which rewriting prohibited (N in step S504), the ECU 10 determines whether or not processing end signal has been received from the rewriting device 20 (Step S505). If the processing end signal is received (Y in Step S505), the ECU 10 ends the processing. If the processing end signal has not been received (N in step S505), the ECU 10 returns the processing to step S502 to receive the rewrite data for the next CH program area.

On the other hand, if it is determined in step S504 that the CHx program area A2x is the mask exclusion area (Y in step S504), the ECU 10 deletes the stored content of the CHx program area A2x (step S506). Next, the ECU 10 judges whether or not the deletion of the memory contents succeeds or fails (step S507). The ECU 10 reads out the memory contents of the CHx program area A2x in step S507, and the ECU 10, if 1 is written, judges deletion success, and if 0 is written, judges deletion failure. If the deletion does not succeed (NO in step S507), the ECU 10 sends the processing stop signal to the rewriting device 20 (step S503), and the processing is terminated. If the deletion is successful (Y in step S507), the ECU 10 rewrites data by writing the CHx rewrite data received from the rewriting device 20 into the CHx program area A2x (step S508). Next, the ECU 10 judges whether or not the rewrite has succeeded (step S509). The ECU 10 first reads the memory contents of the CHx program area A2x in this judge. Then the ECU 10 determines that the rewriting is successful if the read-out memory contents are the same as the received CHx rewrite data and that the rewriting fails if the read-out memory contents are different. If the rewriting is successful (N in step S509), the ECU 10 transmits the processing stop signal to the rewriting device 20 (step S503), and ends the processing. If the rewriting is successful (Y in step S509), the ECU 10, after the judge whether or not the processing end signal is received (step S505) passes, ends the processing, or returns to step S502 to prepare reception of the next rewrite data.

As described above, the processing end signal is transmitted from the rewriting apparatus 20 when the transmission of the rewrite data for all of the CH1 to CHn program areas A71 to A7n is completed. That is, the case that the processing end signal is determined to be received in step S505 means that the memory contents have been completely rewritten for all of the mask exclusion areas of all the program areas. Therefore, the ECU 10 end the processing if it is determined to be received the processing end signal in step S505. ECU 10 activates the normal processing when the rewrite signal is not received from the rewriting device 20. When the rewrite signal is newly received, the ECU 10 executes the rewrite processing again from the mask setting processing S21.

According to the present embodiment described above, it is possible to prohibit or allow rewriting of arbitrary program areas in the mask setting processing, so that all of the CH1 to CHn program areas A71 to A7n, for example, can be overwritten, only the desired program area can be rewritten, or flexible rewriting can be performed.

On the other hand, the rewriting device 20 does not need to know which channel area is prohibited from being rewritten or permitted to be rewritten, and only transmits the rewrite data for all of the CH1 to CHn program areas A71 to A7n. The ECU 10 only needs to receive the rewrite data and rewrite it as the target of the mask exclusion area which is allowed to be rewritten by the mask setting processing. As described in this embodiment it is also possible to shorten the rewrite time since the processing required for rewriting is simple, and the rewriting error can be reduced since the processing required for rewriting is simple.

In this embodiment, the mask setting processing is performed by the ECU 10 having the CH1 to CHn program areas A71 to A7n. Thus, it is possible to perform the mask setting processing with high accuracy compared to the configuration in which the rewriting device 20 communicates with each ECU 10 to perform the mask setting processing, and the like.

In addition, since each ECU 10 recognizes the mask target area and the mask exclusion area based on the hardware status, which is the ON/OFF state of the CH1 to CHn local SW51 to 5n, the mask setting processing is performed with a higher degree of accuracy.

In this embodiment, the CH1 to CHn local SW51 to 5n correspond to the CH1 to CHn program areas A71 to A7n in a one-to-one correspondence. I.e., the ON/OFF states of the respective local switches are set so that each CH program area is directly related to what the mask target area and the mask excluded area are, so that the mask setting processing can be performed with higher accuracy.

In the present embodiment, a plurality of ECUs 10 is provided in the rewriting system 1. The mask setting processing is performed individually in each ECU 10, and the rewriting device 20 transmits the rewrite data of all the memory contents for the CH1 to CHn program areas A71 to A7n commonly to all the plurality of ECUs 10. That is, the rewriting device 20 simply transmits all rewrite data for the CH1 to CHn program areas A71 to A7n without distinction between the ECUs 10. Therefore, it is possible to shorten the rewrite time even with the rewriting system 1 for the ECUs 10.

It is to be understood that the above-described embodiments are merely representative examples and are not to be construed as limiting the scope of the present invention. Namely, the above-described rewriting system, rewriting device, and the computer can be implemented in various modifications without deviating from the scope of the present invention. It is of course also included in the category as long as the essential constitution of the above-mentioned rewriting system, rewriting device, and computer is included even with such a modification.

For example, in the above-described embodiment, the ECU 10 having the flash ROM 14B is exemplified as an example of a computer having the memory described in the present invention. However, the computer having the memory in the present invention is not limited to this, and is not questioned of its concrete form.

In the above-described embodiment, as an example of the memory in the present invention, a flash ROM 14B having a non-rewrite target area A6 and a rewrite target area A7 is exemplified. Furthermore, as an example of the plurality of channel areas the present invention describes, the input judgment control program, the base application control program, the output judgment control program, and the CH1 to CHn program areas A71 to A7n in which the variable and setting value are stored are exemplified. The memory and the plurality of channel areas the present invention describes are not limited to this. The specific memory contents in each channel area can be set arbitrarily, and the specific memory area configuration can also be arbitrarily set if any multiple channel areas.

In the embodiment described above, as an example of the rewriting system in the present invention, the rewriting system 1 having the plurality of ECUs 10 is illustrated. However, the rewriting system in the present invention is not limited to such an example, but may be a system equipped with a single computer.

In the above-described embodiment, an example of a configuration of the CPU 14A of the ECU 10 and the CH1 to CHn local SW51 to 5n provided in the ECU 10 is illustrated as an example of the mask setting section in the present invention. The mask setting section in the present invention, however, is not limited to this embodiment, but may be, for example, provided with a rewriting device to perform a mask setting processing through communication with a computer such as an ECU, etc. In addition, a part of the processing function of the mask setting processing may be provided in each of the computer and the rewrite device, and both may perform the mask setting processing in cooperation with each other. Alternatively an external device other than the rewrite device may be provided, so as to be connected to a computer such as an ECU to perform a mask setting processing.

In addition, the mask setting section in this invention, even being installed in a computer such as an ECU, is not limited to a form that includes CH1 to CHn local SW51 to 5n provided one-to-one with the CH1 to CHn program areas A71 to A7n. The mask setting section in the present invention has, for example, a small number of local switches, and uses any combination of the ON/OFF states of these local switches to set any area as the masked area and the mask exclusion area. Alternatively, in the first place, without local switches, for example, it may be a form that analog data of what kind of area is used as the mask target area and the mask exclusion area according to its level.

Alternatively, a rewriting device at least transmitting to a computer a rewrite data of memory contents stored in a memory included in the computer may be conceivable, wherein the memory includes a rewrite target area in which the memory contents to be rewritten are stored, and a non-rewrite target area in which the memory contents not to be rewritten are stored, and wherein the rewrite data of the memory contents is transmitted to the computer only for the memory contents of the rewrite target area in the memory.

Preferably, the rewriting device rewrites the memory contents of a plurality of the computers, and the rewrite data of the common memory contents common to the plurality of computers is collectively transmitted to the plurality of computers, and the rewrite data of the non-common memory contents non-common to the plurality of computers is sequentially transmitted to the computer to be rewritten.

Preferably, the computer controls a plurality of control objects, the memory in the computer is provided with a plurality of channel areas in which the memory contents used for controlling each of the plurality of control objects are stored in correspondence with the plurality of control objects, the plurality of channel areas is implemented with a mask setting processing setting a mask target area for prohibiting rewriting and a mask exclusion area for permitting rewriting, and the rewrite data of the memory contents for all of the plurality of channel areas is transmitted to the computer.

Alternatively, a computer including a memory and at least receiving from a rewriting device a rewrite data of memory contents stored in the memory may be conceivable, wherein the memory includes a rewrite target area in which the memory contents to be rewritten are stored, and a non-rewrite target area in which the memory contents not to be rewritten are stored.

Preferably, the memory includes a common area in which common memory contents common to another computer are stored and a non-common area in which non-common memory contents non-common to the another computer are stored.

Preferably, the computer controls a plurality of control objects, the memory is provided with a plurality of channel areas in which the memory contents used for controlling each of the plurality of control objects are respectively stored in correspondence with the plurality of control objects, the plurality of channel areas is implemented with a mask setting processing setting a mask target area for prohibiting rewriting, and a mask exclusion area for permitting rewriting, and the memory contents of the mask exclusion area is rewritten using the rewrite data corresponding to the memory exclusion area among the rewrite data transmitted from the rewriting device for all of the plurality of channel areas.

REFERENCE SIGNS LIST 1 rewriting system
10 ECU (computer)
14A CPU (part of the mask setting section)
14B Flash ROM (memory)
20 writing device
51 to 5n CH1 to CHn local SW (part of the mask setting section)
61 to 6n CH1 to CHn load
A1, A3 rewrite target area
A4 common rewrite target area (common area)
A5 non-common rewrite target area (non-common area)
A6 non-rewrite target area
A7 rewrite target area
A2 rewrite target area
A21 program area
A22 variable area
A23 setting value area
A71 t A7n CH1 to CHn Program areas (channel areas)

The invention claimed is:
1. A rewriting system comprising:
a computer including a memory;
a rewriting device for at least transmitting a rewrite data of first memory contents stored in the memory to the computer, wherein the memory in the computer includes a rewrite target area in which the first memory contents to be rewritten are stored, and a non-rewrite target area in which second memory contents not to be rewritten are stored, the rewriting device transmits the rewrite data of the first memory contents to be rewritten to the computer only for the first memory contents to be rewritten of the rewrite target area in the memory, the rewrite target area includes a program area in which one or more programs are stored, a variable area in which a variable used for processing is stored for each of the one or more programs, and a setting value area in which a setting value used for processing is stored for each of the one or more programs, and wherein the rewriting device selects any one or more of data from the one or more programs stored in the program area, the variable stored in the variable area, and the setting value stored in the setting value area, and transmits the selected any one or more of data, from the one or more programs stored in the program area, the variable stored in the variable area, and the setting value stored in the setting value area, as the rewrite data, wherein the one or more programs are configured to implement, when processing of one or more inputs according to at least one of the variable and the setting value, referencing the at least one of the variable and the setting value.

2. The rewriting system according to claim 1, wherein a plurality of computers, comprising a plurality of memories, is provided, the plurality of computers including the computer, and the plurality of memories including the memory, wherein each of the plurality of memories of the plurality of computers includes a common area in which common memory contents common to each other are stored and a non-common area in which non-common memory contents non-common to each other are stored, and wherein the rewriting device collectively transmits common rewrite data of the common memory contents to the plurality of computers, and sequentially transmits non-common rewrite data of the non-common memory contents to at least one of the plurality of computers.

3. The rewriting system according to claim 2, wherein the rewriting device transmits at a communication speed corresponding to a data amount of at least one of the common rewrite data and the non-common rewrite data.

4. The rewriting system according to claim 1, wherein the computer controls a plurality of control objects,
the memory in the computer is provided with a plurality of channel areas in which the first memory contents to be rewritten and which are to be used for controlling each of the plurality of control objects are stored in correspondence with the plurality of control objects, wherein a mask setting section is provided for performing mask setting processing setting a mask target area for prohibiting rewriting and a mask exclusion area for permitting rewriting, among the plurality of channel areas, wherein the rewriting device transmits the rewrite data of the first memory contents to be rewritten for all of the plurality of channel areas, and wherein the computer rewrites the first memory contents to be rewritten of the mask exclusion area using the rewrite data corresponding to the mask exclusion area among the rewrite data transmitted from the rewriting device.

5. The rewriting system according to claim 4, wherein the mask setting section is provided in the computer to perform the mask setting processing.

6. The rewriting system according to claim 5, the mask setting section has a plurality of local switches provided in the computer, so as to know that each of the channel areas is any one of the mask target area and the mask exclusion area depending on ON/OFF states of the plurality of local switches.

7. The rewriting system according to claim 6, wherein the plurality of local switches corresponds to the plurality of channel areas.

8. The rewriting system according to claim 7, wherein a plurality of computers is provided, the plurality of computers includes the computer,
the mask setting section individually performs the mask setting processing for each of the plurality of computers, and wherein
the rewriting device transmits the rewrite data of the first memory contents to be rewritten of the plurality of channel areas commonly for all of the plurality of computers.

9. The rewriting system according to claim 6, wherein a plurality of computers is provided, the plurality of computers includes the computer,
the mask setting section individually performs the mask setting processing for each of the plurality of computers, and wherein
the rewriting device transmits the rewrite data of the first memory contents to be rewritten of the plurality of channel areas commonly for all of the plurality of computers.

10. The rewriting system according to claim 5, wherein a plurality of computers is provided, the plurality of computers includes the computer,
the mask setting section individually performs the mask setting processing for each of the plurality of computers, and wherein
the rewriting device transmits the rewrite data of the first memory contents to be rewritten of the plurality of channel areas commonly for all of the plurality of computers.

11. The rewriting system according to claim 4, wherein a plurality of computers is provided, the plurality of computers includes the computer,
the mask setting section individually performs the mask setting processing for each of the plurality of computers, and wherein
the rewriting device transmits the rewrite data of the first memory contents to be rewritten of the plurality of channel areas commonly for all of the plurality of computers.

12. The rewriting system according to claim 1, wherein the one or more programs comprises instructions which when executed by the computer cause the computer to implement processing the one or more inputs which are received from at least one of an electronic control unit and a switch.

13. The rewriting system according to claim 1, wherein the at least one of the variable and the setting value is at least one of a filter value and a timer value.

* * * * *